United States Patent [19]
Suzuki

[11] Patent Number: 6,104,858
[45] Date of Patent: Aug. 15, 2000

[54] APPARATUS FOR REPRODUCING A VIDEO SIGNAL AND A CORRECTIVE SIGNAL AND FOR CORRECTING THE VIDEO SIGNAL IN RESPONSE TO THE CORRECTIVE SIGNAL

[75] Inventor: Koji Suzuki, Yokohama, Japan

[73] Assignee: Victor Company of Japan, Ltd., Yokohama, Japan

[21] Appl. No.: 08/852,816

[22] Filed: May 7, 1997

Related U.S. Application Data

[62] Division of application No. 08/309,822, Sep. 21, 1994, Pat. No. 5,646,795.

[30] Foreign Application Priority Data

Sep. 30, 1993 [JP] Japan ..................................... 5-268306

[51] Int. Cl.[7] ...................................................... H04N 5/76

[52] U.S. Cl. ............................... 386/65; 386/95; 386/113

[58] Field of Search .................................. 386/46, 52, 53, 386/65, 60, 85, 69, 73, 95, 113, 86, 47; H04N 5/76, 5/94

[56] References Cited

U.S. PATENT DOCUMENTS

| | | | |
|---|---|---|---|
| 5,091,899 | 2/1992 | Adachi et al. | 386/65 |
| 5,287,224 | 2/1994 | Tsuchiya et al. | 386/65 |
| 5,463,505 | 10/1995 | Kaniwa et al. | 386/65 |

OTHER PUBLICATIONS

"The Specification of Consumer HD–VTR", Keitaro Yamashita et al., ITEJ Technical Report vol. 15, No. 50, Sep. 26, 1991.

*Primary Examiner*—Huy T. Nguyen
*Attorney, Agent, or Firm*—Lowe Hauptman Gopstein Gilman & Berner

[57] ABSTRACT

A video signal is divided into a plurality of partial signals. A time code signal is generated which is incremented every field or frame of the video signal. One of predetermined different corrective signals or calibration signals is sequentially selected in response to the time code signal. The time code signal and the selected corrective signal are interposed in segments of the partial signals which relate to a given line of the field or frame to convert the partial signals into composite signals. The composite signals are recorded on the recording medium.

3 Claims, 11 Drawing Sheets

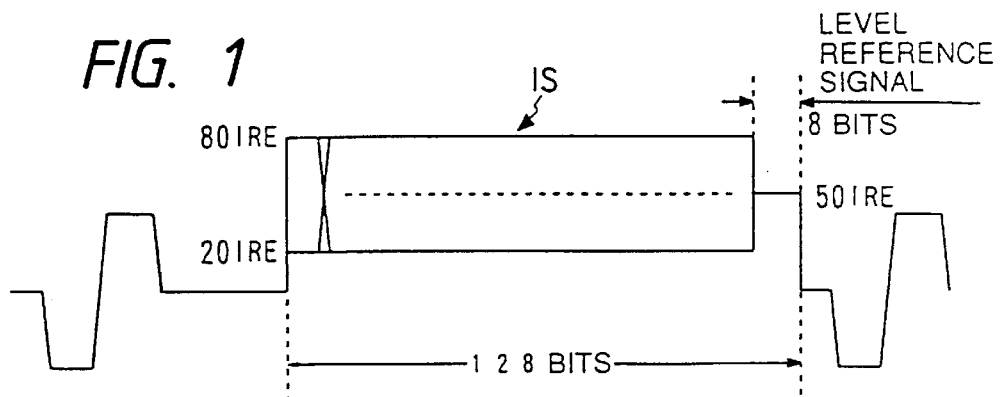
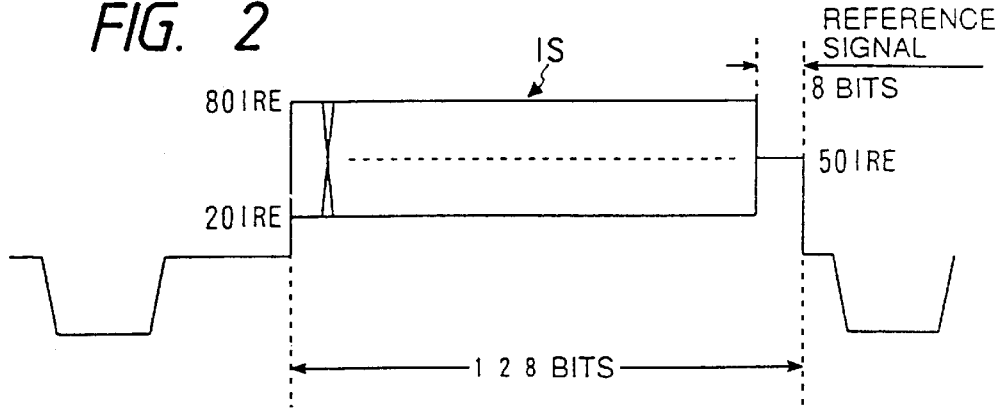
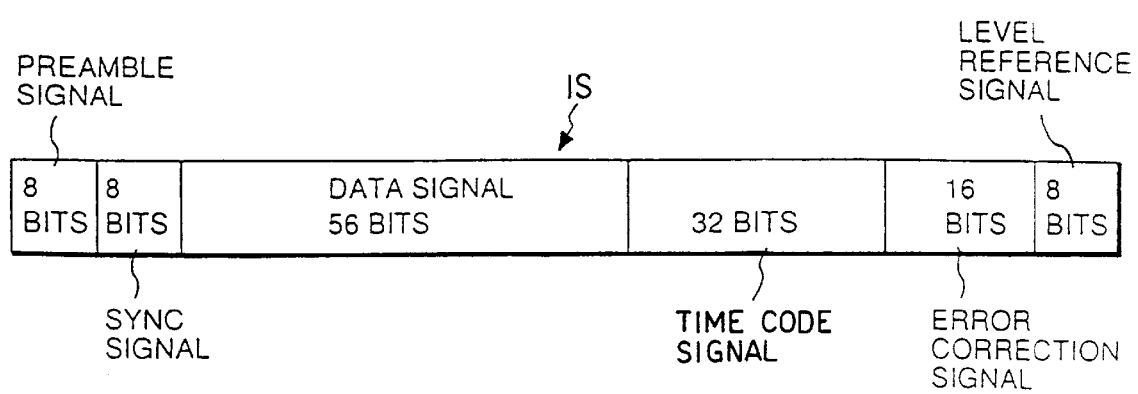

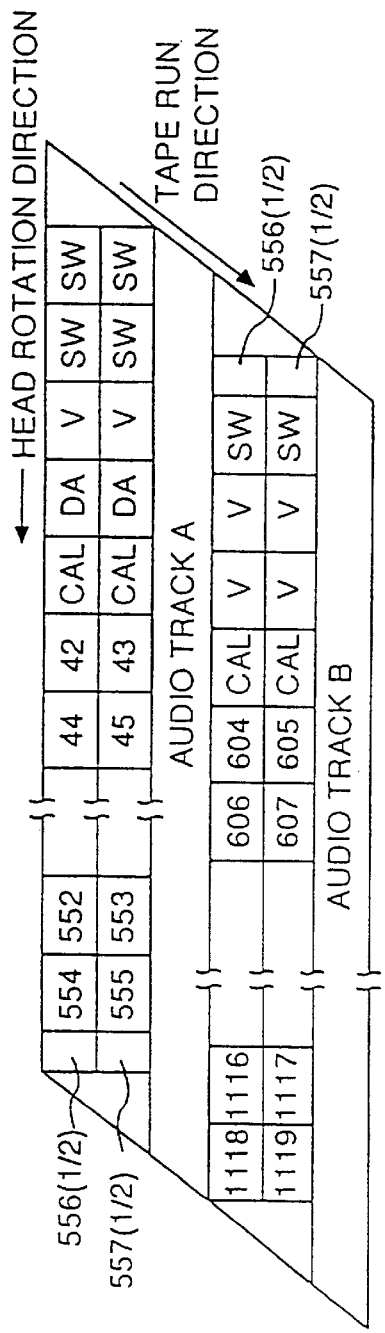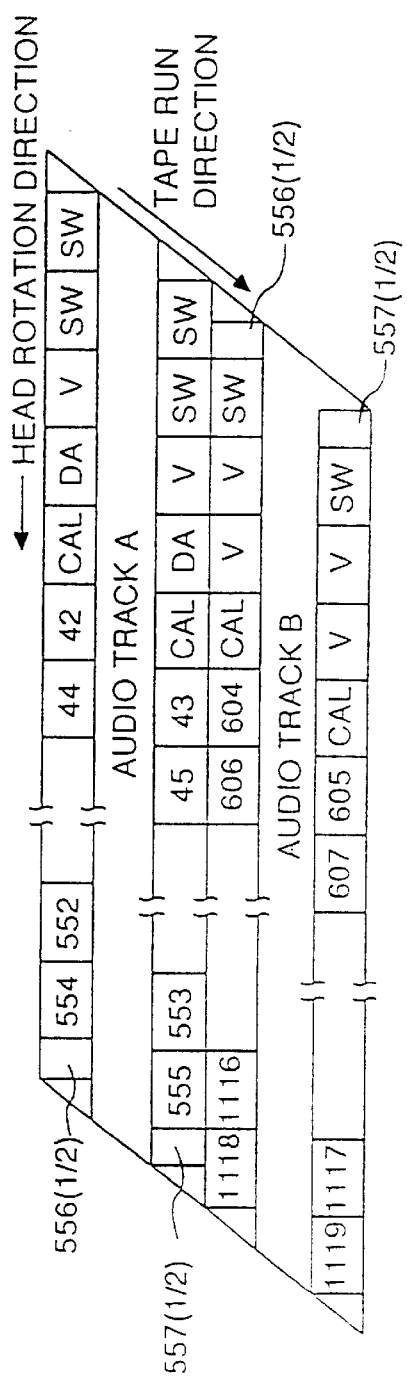

FIRST FIELD

SECOND FIELD

APPARATUS FOR REPRODUCING A VIDEO SIGNAL AND A CORRECTIVE SIGNAL AND FOR CORRECTING THE VIDEO SIGNAL IN RESPONSE TO THE CORRECTIVE SIGNAL

This application is a division of application Ser. No. 08/309,822 filed Sep. 21, 1994, U.S. Pat. No. 5,646,795.

BACKGROUND OF THE INVENTION

1. Field of the Invention

This invention relates to a signal recording apparatus and a signal reproducing apparatus. This invention also relates to a recording medium such as a magnetic tape.

2. Description of the Prior Art

One type of high-density magnetic recording of a video signal is segment recording in which every frame represented by the video signal is divided into a plurality of segments recorded on tracks on a magnetic tape via magnetic heads respectively. During a playback process, the recorded signal segments are reproduced from the tracks via the magnetic heads respectively. Generally, there are a plurality of signal processors related to the respective signal segments. During the playback process, a variation in characteristics among the signal processors causes a line flicker or a field flicker in indicated pictures generated from the reproduced signal segments.

An advanced high-vision VTR (video tape recorder) is designed to solve the above-indicated flicker problem (see ITFJ Technical Report, Vol. 15, No. 50, pp 1–6, Sep. 1991). The advanced high-vision VTR generates a plurality of corrective signals (calibration signals) designed to compensate for a variation in characteristics among signal processors. The corrective signals are recorded on starting potions of tracks on a magnetic tape. During a playback process, the corrective signals are reproduced from the tracks, and compensation for the variation in characteristics among the signal processors is executed in response to the reproduced corrective signals.

The advanced high-vision VTR has a problem such that recording of the corrective signals reduces the efficiency of use of the magnetic tape with respect to video information.

Some of magnetic recording and reproducing apparatus are of the deep-layer recording type in which an FM audio signal is recorded into a deep layer portion of a magnetic tape while a video signal, which results from frequency-multiplexing an FM luminance signal and frequency-down-converted color signals, is recorded on the magnetic tape.

Generally, an audio signal is of various types or modes such as a monophonic mode, a stereophonic mode, and a two-channel mode. An example of the two-channel mode is a bilingual mode in which main-channel information contains Japanese voices while sub-channel information contains English voices.

When such a two-channel audio signal is reproduced from a magnetic tape by the above-indicated apparatus of the deep-layer recording type, Japanese and English voices are simultaneously generated from loudspeakers in the apparatus. In such a case, the user is required to handle a manual switch in the apparatus to select desired one of the Japanese information and the English information.

SUMMARY OF THE INVENTION

It is a first object of this invention to provide an improved signal recording apparatus.

It is a second object of this invention to provide an improved signal reproducing apparatus.

It is a third object of this invention to provide an improved magnetic tape.

A first aspect of this invention provides an apparatus for dividing a video signal into a plurality of partial signals and recording the partial signals on a recording medium which comprises means for generating a time code signal incremented every field or frame of the video signal; means for sequentially selecting one of predetermined different corrective signals in response to the time code signal; means for interposing the time code signal and the selected corrective signal in segments of the partial signals which relate to a given line of the field or frame to convert the partial signals into composite signals; and means for recording the composite signals on the recording medium.

A second aspect of this invention provides an apparatus for dividing a video signal into a plurality of partial signals and recording the partial signals on a recording medium which comprises means for generating a time code signal representing a time code number incremented every field or frame of the video signal; means for dividing the time code number by a predetermined natural number Q equal to or greater than 2, and generating a signal representing a remainder of the dividing; means for sequentially selecting one of predetermined R different corrective signals in response to the remainder-representing signal, wherein R denotes a predetermined natural number equal to or smaller than the number Q; means for interposing the time code signal and the selected corrective signal in segments of the partial signals which relate to a given line of the field or frame to convert the partial signals into composite signals; and means for recording the composite signals on the recording medium.

A third aspect of this invention provides an apparatus for dividing a video signal into a plurality of partial signals and recording the partial signals on a recording medium which comprises means for selecting one of predetermined different corrective signals; means for generating an information signal representing a presence and an absence of the selected corrective signal; means for interposing the selected corrective signal and the information signal in segments of the partial signals which relate to a given line of a field or frame of the video signal to convert the partial signals into composite signals; and means for recording the composite signals on the recording medium.

A fourth aspect of this invention provides an apparatus for dividing a video signal into a plurality of partial signals and recording the partial signals on a recording medium which comprises means for generating a time code signal representing a time code number incremented every field or frame of the video signal; means for dividing the time code number by a predetermined natural number Q equal to or greater than 2, and generating a signal representing a remainder of the dividing; means for sequentially selecting one of predetermined R different corrective signals in response to the remainder-representing signal. wherein R denotes a predetermined natural number equal to or smaller than the number Q; means for generating an information signal representing a presence and an absence of the selected corrective signal; means for interposing the time code signal, the information signal, and the selected corrective signal in segments of the partial signals which relate to a given line of the field or frame to convert the partial signals into composite signals; and means for recording the composite signals on the recording medium.

It is preferable that the apparatus further comprises means for extracting audio identification information from the video signal, the audio identification information representing a type of an audio signal related to the video signal, and means for adding the audio identification information to the information signal.

A fifth aspect of this invention provides a magnetic tape having a plurality of tracks extending in directions oblique thereto, the tracks storing partial signals composing a video signal, the tracks storing a time code signal incremented every field or frame of the video signal, the tracks storing a corrective signal sequentially selected from among predetermined different corrective signals, the time code signal and the selected corrective signal being interposed in segments of the partial signals which relate to a given line of the field or frame.

A sixth aspect of this invention provides a magnetic tape having a plurality of tracks extending in directions oblique thereto, the tracks storing partial signals composing a video signal, the tracks storing a corrective signal selected from among predetermined different corrective signals, the tracks storing an information signal representing a presence and an absence of the selected corrective signal, the selected corrective signal and the information signal being interposed in segments of the partial signals which relate to a given line of a field or frame of the video signal.

A seventh aspect of this invention provides a video signal reproducing apparatus comprising means for reproducing a video signal from a recording medium, the video signal containing a time code signal and a corrective signal, the time code signal being incremented every field or frame of the video signal, the corrective signal being sequentially selected from among predetermined different corrective signals in response to the time code signal; means for extracting the time code signal from the reproduced video signal; means for identifying the corrective signal in the reproduced video signal in response to the extracted time code signal; and means for correcting the reproduced video signal in response to a result of said identifying.

An eighth aspect of this invention provides a video signal reproducing apparatus comprising means for reproducing a video signal from a recording medium, the video signal containing a time code signal and a corrective signal, the time code signal being incremented every field or frame of the video signal, the corrective signal being sequentially selected from among predetermined R different corrective signals in response to a remainder of dividing a number represented by the time code signal by a predetermined natural number Q equal to or greater than 2, wherein R denotes a predetermined natural number equal to or smaller than the number Q; means for extracting the time code signal from the reproduced video signal; means for dividing the number represented by the time code signal by the number Q, and generating a signal representing a remainder of said dividing; means for identifying the corrective signal in the reproduced video signal in response to the remainder-representing signal; and means for correcting the reproduced video signal in response to a result of said identifying.

A ninth aspect of this invention provides a video signal reproducing apparatus comprising means for reproducing a video signal from a recording medium, the video signal containing a corrective signal and an information signal, the corrective signal being selected from among predetermined different corrective signals, the information signal representing a presence and an absence of the corrective signal; means for extracting the information signal from the reproduced video signal; means for extracting the corrective signal from the reproduced video signal; means for correcting the reproduced video signal in response to the corrective signal when the extracted information signal represents the presence of the corrective signal; and means for non-correcting the reproduced video signal when the extracted information signal represents the absence of the corrective signal.

A tenth aspect of this invention provides a video signal reproducing apparatus comprising means for reproducing a video signal from a recording medium, the video signal containing a time code signal and a corrective signal, the video signal further containing an information signal representing a presence and an absence of the corrective signal, the time code signal being incremented every field or frame of the video signal, the corrective signal being sequentially selected from among predetermined R different corrective signals in response to a remainder of dividing a number represented by the time code signal by a predetermined natural number Q equal to or greater than 2, wherein R denotes a predetermined natural number equal to or smaller than the number Q; means for extracting the time code signal from the reproduced video signal; means for extracting the information signal from the reproduced video signal; means for dividing the number represented by the time code signal by the number Q, and generating a signal representing a remainder of said dividing; means for identifying the corrective signal in the reproduced video signal in response to the remainder-representing signal and the extracted information signal; and means for correcting the reproduced video signal in response to a result of said identifying.

It is preferable that the apparatus further comprises means for reproducing an audio signal from the recording medium, means for extracting an audio identification signal from the reproduced video signal, the audio identification signal representing a type of the audio signal, means for outputting the reproduced audio signal in a changeable format, and means for setting said format in response to the audio identification signal.

BRIEF DESCRIPTION OF THE DRAWINGS

FIG. 1 is a diagram of the waveform of an information signal.

FIG. 2 is a diagram of the waveform of an information signal.

FIG. 3 is a diagram of the format of the information signals in FIGS. 1 and 2.

FIG. 11 is a diagram of a signal record pattern on a magnetic tape which occurs during a W mode of operation of the apparatus in FIG. 5.

FIG. 12 is a diagram of another signal record pattern on a magnetic tape which occurs during the W mode of operation of the apparatus in FIG. 5.

DESCRIPTION OF THE PREFERRED EMBODIMENT

Figure 4:
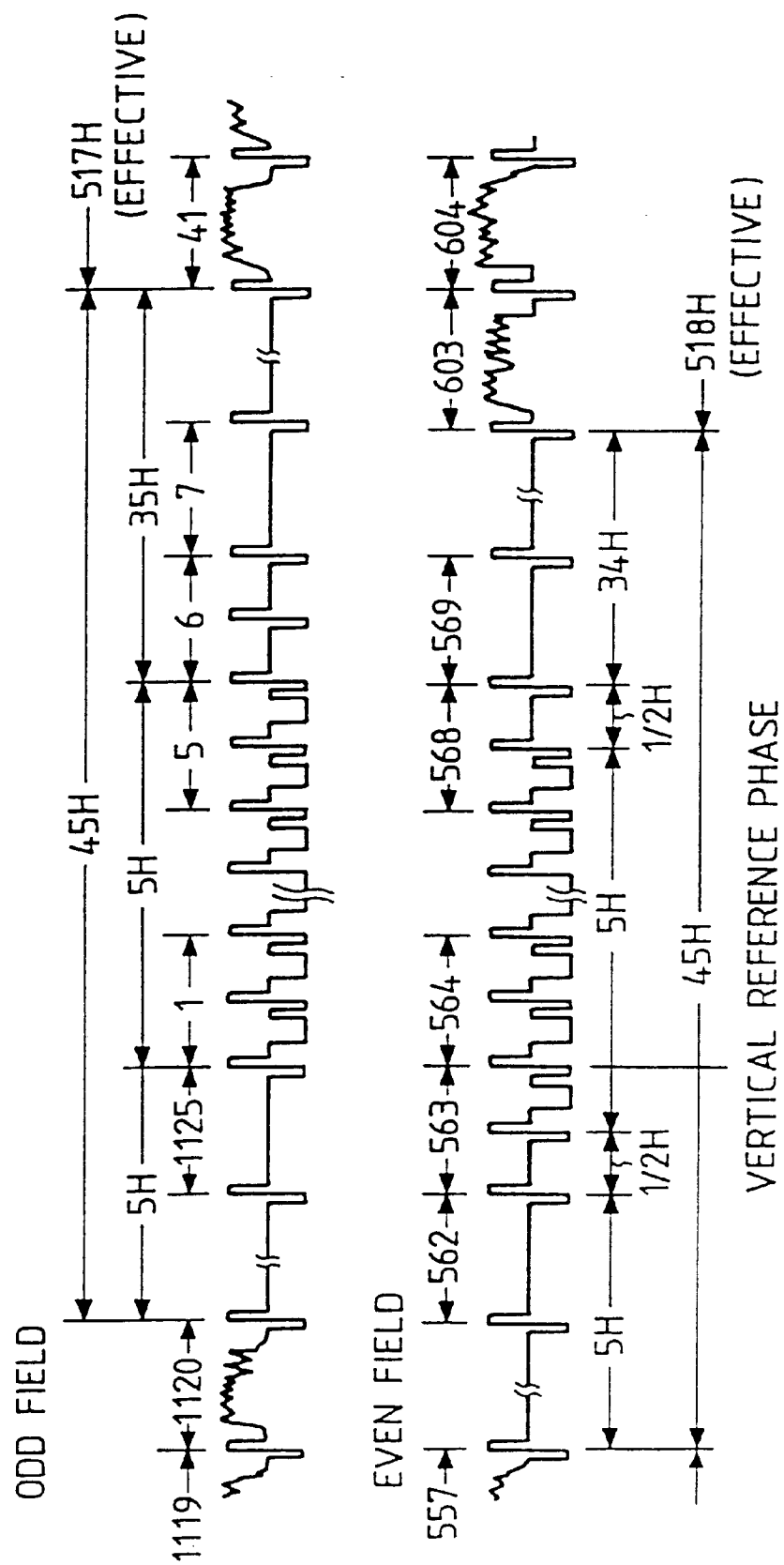
FIG. 4 is a diagram of the waveform of a high-definition television signal.

An apparatus according to an embodiment of this invention can record and reproduce either a combination of a high-definition video signal and an audio signal or a combination of a normal-definition video signal and an audio signal into and from a recording medium. The apparatus according to the embodiment of this invention will be also referred to as the signal recording and reproducing apparatus. A television signal of an HD (high definition) format, which is referred to as an HD signal, is used as an example of the combination of the high-definition video signal and the audio signal. A television signal of an NTSC format, which is referred to as an NTSC signal, is used as an example of the combination of the normal-definition video signal and the audio signal.

The signal recording and reproducing apparatus outputs an HD signal or an NTSC signal which contains an information signal at its time segment corresponding to a given line or lines of every frame (or field). The signal recording and reproducing apparatus receives and accepts such an information-signal-added HD signal or an information-signal-added NTSC signal.

Information Signal

FIG. 1 shows an information signal IS which is interposed in a Y signal (a luminance signal) of the HD format at its time segment corresponding to a given line or lines of every frame (or field). FIG. 2 shows an information signal IS which is interposed in a Y signal (a luminance signal) of the NTSC format at its time segment corresponding to a given line or lines of every frame (or field). Each of the information signals IS of FIGS. 1 and 2 has a digital-signal portion and an analog-signal portion. The digital-signal portion precedes the analog-signal portion. The digital-signal portion has a sequence of 120 bits each changeable between 20 IRE and 80 IRE which correspond to logic levels of "0" and "1" respectively. The analog-signal portion occupies an interval corresponding to 8 bits. The analog-signal portion represents a level reference signal which has a constant level normally corresponding to 50 IRE.

As shown in FIG. 3, each information signal IS has a sequence of an 8-bit preamble signal, an 8-bit sync signal, a 56-bit data signal, a 32-bit time code signal, a 16-bit error correction signal, and the level reference signal. The preamble signal, the sync signal, the data signal, the time code signal, and the error correction signal compose the previously-indicated digital-signal portion of the information signal IS. The preamble signal is used in providing synchronism with a clock signal during reproduction. The sync signal is used in discriminating a start of data (a start of the data signal). The data signal represents information such as the type of the related television signal (the currently-handled television signal). The time code signal represents time information. The error correction signal is used in detecting and correcting signal errors during reproduction. The level reference signal is used in controlling a recording level.

The data signal in the information signal IS has a sequence of 7 words each composed of 8 bits. The first word represents information of the format of the related television signal (the currently-handled television signal). Specifically, the first word represents aspect ratio information (discrimination between an aspect ratio of 16:9 and an aspect ratio of 4:3), picture display format information (discrimination between a letter box and an ordinary format), track system information (discrimination among HD, NTSC, and EDTV), and telecine information (discrimination between the same frame or another). Here, "EDTV" is short for extended definition television. The second word has program ID information representing a program number. The third word represents information regarding the related audio signal (discrimination among "stereophonic", "monophonic", and "bilingual"). The third word also represents editing information (discrimination among editing start, editing end, and in-editing), corrective signal information (discrimination between the presence and the absence of a corrective signal), and control signal information (the duty ratios of control signals such as VISS and VASS). The fourth and fifth words represent text information containing character information according to a closed caption method. The sixth and seventh words are reserved.

The time code signal in the information signal IS has a sequence of 4 words each composed of 8 bits. The first word represents a frame number which is incremented every frame. The second, third, and fourth words represent "second", "minute", and "hour" respectively. It should be noted that the first word of the time code signal may represent a field number which is incremented every field.

As shown in FIG. 4, a 1-frame HD signal has time segments corresponding to 1125 lines respectively. Here, "lines" are short for horizontal scanning lines. In FIG. 4, numerals such as "1119", "1125", "1", "41", "557", "604" denote line order numbers. The start of the first line coincides with the start of a vertical sync signal in an odd field of every frame.

An information signal IS is interposed in a time segment of an HD signal which corresponds to a given line or lines of every frame.

It is desirable that the line-corresponding signal segment or segments in which an information signal IS should be interposed are selected from among line-corresponding signal segments representative of display picture information with a low possibility of appearing on a display screen. Accordingly, in the case of an HD signal which is either a studio standard HD signal or a MUSE decoder output signal, it is preferable that an information signal IS is interposed in a signal time segment corresponding to a given line or lines selected from among the 41-st line to the 66-th line, the 532-nd to the 557-th line, the 603-rd line to the 628-th line, and the 1095-th line to the 1120-th line. It is most preferable that an information signal IS is interposed in a signal time segment corresponding to a given line or lines selected from among the 41-st line, the 42-nd line, the 557-th line, the 603-rd line, the 604-th line, the 1119-th line, and the 1120-th line.

The 41-st line and the 603-rd line correspond to ineffective horizontal scanning lines in the case of a MUSE decoder output signal but correspond to effective horizontal scanning lines in the case of an HD signal in conformity to the studio standards. Accordingly, in the case where an HD signal is not encoded into a MUSE signal, it is preferable to place an information signal IS in a signal time segment corresponding to at least one of the 41-st line and the 603-rd line.

In the embodiment, the signal recording and reproducing apparatus converts an original HD signal into an information-signal-added HD signal by adding an information signal IS to a time segment of the original HD signal which corresponds to the 603-rd line. In addition, the signal recording and reproducing apparatus receives and accepts an HD signal containing an information signal IS at its time segment corresponding to the 603-rd line or the 604-th line.

In the case of an NTSC signal, it is preferable that an information signal IS is interposed in a signal time segment corresponding to the 19-th line.

Recording Side

A recording side (recording system) of the signal recording and reproducing apparatus operates in one of a W mode, a W-NT mode, and a 2NT mode. Operation of the recording side of the apparatus can be changed among the W mode, the W-NT mode, and the 2NT mode. During the W mode of operation, an HD signal is recorded on a magnetic tape driven at a standard speed. During the W-NT mode of operation, an NTSC signal representative of one program is recorded on a magnetic tape driven at a long-term-corresponding speed. During the 2NT mode of operation. NTSC signals representative of two programs are recorded on a magnetic tape driven at the standard speed.

Figure 5:
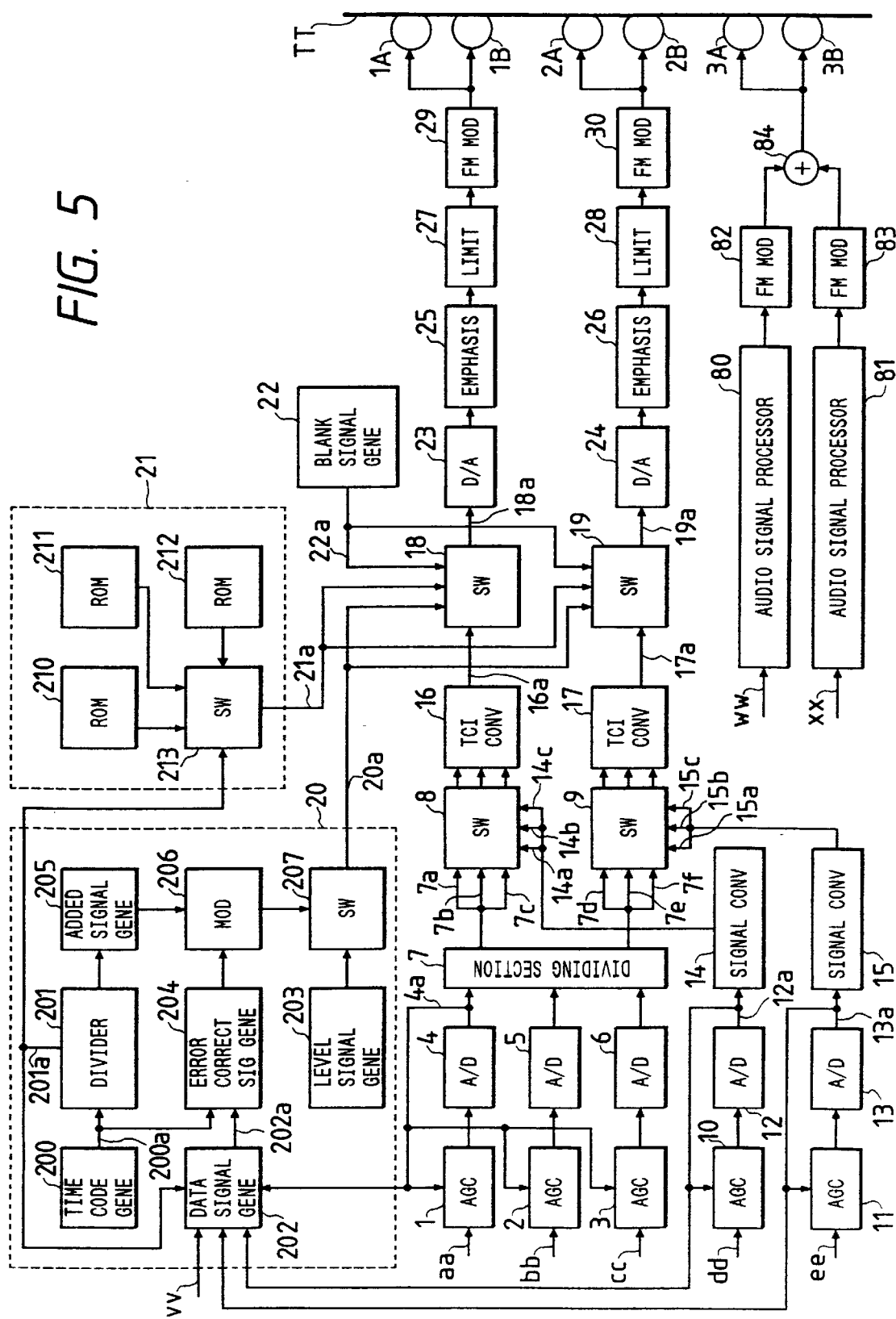
FIG. 5 is a block diagram of a recording side of a signal recording and reproducing apparatus according to an embodiment of this invention.

The W mode of operation of the apparatus will now be described in detail. With reference to FIG. 5, the recording side of the signal recording and reproducing apparatus includes AGC sections 1, 2, and 3. An input Y signal (an input luminance signal) "aa" is fed to the AGC section 1 from a transmission line (not shown). Input PB and PR signals (input color signals) "bb" and "cc" are fed to the AGC sections 2 and 3 from the transmission line respectively. The input Y, PB, and PR signals "aa", "bb", and "cc" compose the video part of an HD signal or a MUSE decoder output signal.

The Y, PB, and PR signals are in conformity to the Japanese high-vision standards, and are generated from R, G, and B (red, green, and blue) signals by conversion expressed as follows.

Y=0.7154G+0.0721B+0.2125R

PB=0.5389(−0.7154G+0.9279B−0.2125R)

PR=0.6349(−0.7154G−0.0721B+0.7875R)

The AGC sections 1, 2, and 3 adjust the amplitude levels of the Y, PB, and PR signals in response to an output signal 4a from an A/D converter 4 which relates to the level reference signal in an information signal IS. The level reference signal contained in a signal segment corresponding to the 603-rd line is put in the first position of priority regarding operation of the AGC sections 1, 2, and 3. In the case where a signal segment corresponding to the 603-rd line lacks the level reference signal but a signal segment corresponding to the 604-th line contains the level reference signal, the AGC sections 1, 2, and 3 use the level reference signal in the 604-th-line signal segment. In the case where neither a signal segment corresponding to the 603-rd line nor a signal segment corresponding to the 604-th line contains the level reference signal, the AGC sections 1, 2, and 3 use the amplitude level of a horizontal sync signal instead of the level reference signal in controlling the amplitude levels of the Y, PB, and PR signals. Even if the input Y, PB, and PR signals have excessively large amplitudes, the amplitude-level control by the AGC sections 1, 2, and 3 prevents the occurrence of errors in an information signal IS during signal processing by amplitude limiters 27 and 28 at later stages.

The resultant Y, PB, and PR signals "aa", "bb", and "cc", that is, the output signals of the AGC sections 1, 2, and 3, are fed to A/D converters 4, 5, and 6 respectively, and are converted into corresponding digital signals thereby. The digital Y, PB, and PR signals, that is, the output signals of the A/D converters 4, 5, and 6 are fed to a signal dividing section 7 before being separated into two groups thereby.

Figure 6:
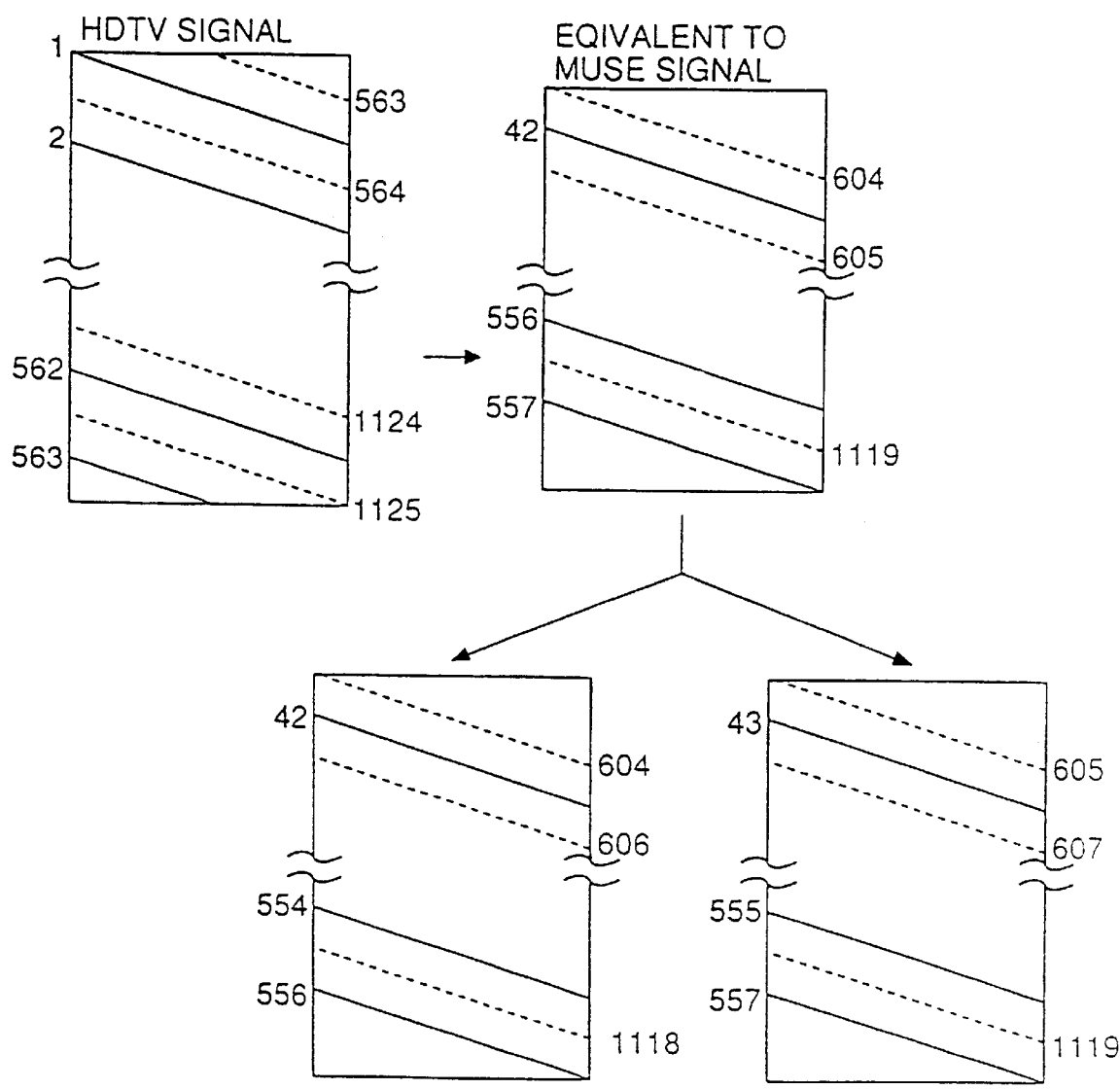
FIG. 6 is a flow diagram of operation of a dividing section in the apparatus of FIG. 5.

Operation of the signal dividing section 7 will now be described with reference to FIG. 6. In the case of an HD signal, some of 1125 lines composing one frame correspond to a vertical blanking period or other periods which have no relation with display picture information. Therefore, the recording of all 1125 lines into a recording medium causes a reduction of the efficiency of use of the recording medium regarding display picture information. To prevent such an efficiency reduction, as shown in FIG. 6, the Y, PB, and PR signals (composing the HD signal) are compressed into MUSE-corresponding signals by eliminating their segments related to sync components and related to regions above and below an effective display picture region. In the MUSE-corresponding signals, one frame is composed of 1032 lines equal in number to effective horizontal scanning lines of a frame of the MUSE format. Specifically, in the MUSE-corresponding signals, one frame is composed of the original 42-nd line to the original 557-th line, and the original 604-th line to the original 1119-th line. Further, the MUSE-corresponding signals are divided into line-corresponding segments which are separated into two groups as shown in the lower left and lower right sides of FIG. 6. The first group has signal segments related to the even-numbered lines while the second group has signal segments related to the odd-numbered lines. As a result, the Y signal is divided into a first sub Y signal 7a related to the even-numbered lines and a second sub Y signal 7d related to the odd-numbered lines. In addition, the PB signal is divided into a first sub PB signal 7b related to the even-numbered lines and a second sub PB signal 7e related to the odd-numbered lines. Furthermore, the PR signal is divided into a first sub PR signal 7c related to the even-numbered lines and a second sub PR signal 7f related to the odd-numbered lines.

The signal dividing section 7 includes, for example, frame memories and circuits for controlling the writing and reading of signals into and from the frame memories. In an alternative arrangement, the signal dividing section 7 includes switches changed in response to control signals having a period corresponding to one line.

The first Y, PB, and PR signals 7a, 7b, and 7c are fed from the signal dividing section 7 to a selector or switch 8. The second Y, PB, and PR signals 7d, 7e, and 7f are fed from the signal dividing section 7 to a selector or switch 9. The signal processing by the signal dividing section 7 deletes signal segments corresponding to the 603-rd line or the 604-th line which contain the information signal IS. Accordingly, an information signal generator 20 (described later) produces a time-base-compressed TCI (time compressed integration) information signal 20a which is added to a record signal at a position corresponding to a given line.

The switch 8 receives third Y, PB, and PR signals 14a, 14b, and 14c from a signal converter 14. The switch 9 receives fourth Y, PB, and PR signals 15a, 15b, and 15c from a signal converter 15. The switches 8 and 9 select some of the first signals Y, PB, and PR signals 7a, 7b, and 7c, the second Y, PB, and PR signals 7d, 7e, and 7f, the third Y, PB, and PR signals 14a, 14b, and 14c, and the fourth Y, PB, and PR signals 15a, 15b, and 15c in response to a mode signal generated by a suitable device (not shown). When the mode signal represents the W mode, the switch 8 selects the first Y, PB, and PR signals 7a, 7b, and 7c and transmits the selected signals to a TCI converter 16 and the switch 9 selects the second Y, PB. and PR signals 7d, 7e, and 7f and transmits the selected signals to a TCI converter 17. When the mode signal represents the W-NT mode, the switch 8 selects the third Y, PB, and PR signals 14a, 14b. and 14c and transmits the selected signals to the TCI converter 16 and the switch 9 does not transmit any signals to the TCI converter 17. When the mode signal represents the 2NT mode, the switch 8 selects the third Y, PB, and PR signals 14a, 14b, and 14c and transmits the selected signals to the TCI converter 16 and the switch 9 selects the fourth Y, PB, and PR signals 15a, 15b, and 15c and transmits the selected signals to the TCI converter 17.

The TCI converter 16 combines the received PB and PR signals into line sequential color signals, and compresses the line sequential color signals into compressed line sequential color signals with respect to time base. The TCI converter 16 compresses the received Y signal into a compressed Y signal with respect to time base. Then, the TCI converter 16 multiplexes the compressed line sequential color signals and the compressed Y signal into a TCI signal 16a. The TCI converter 16 outputs the TCI signal 16a to a selector or switch 18.

The TCI converter 17 combines the received PB and PR signals into line sequential color signals, and compresses the line sequential color signals into compressed line sequential color signals with respect to time base. The TCI converter 17 compresses the received Y signal into a compressed Y signal with respect to time base. Then, the TCI converter 17 multiplexes the compressed line sequential color signals and the compressed Y signal into a TCI signal 17a. The TCI converter 17 outputs the TCI signal 17a to a selector or switch 19.

The switch 18 receives the TCI information signal 20a from the information signal generator 20. The switch 18 receives a corrective signal (calibration signal) 21a from a corrective signal generator (calibration signal generator) 21. The switch 18 receives a blanking signal 22a from a blanking signal generator 22. The blanking signal 22a contains a switching signal and a vertical sync signal.

Figure 7:
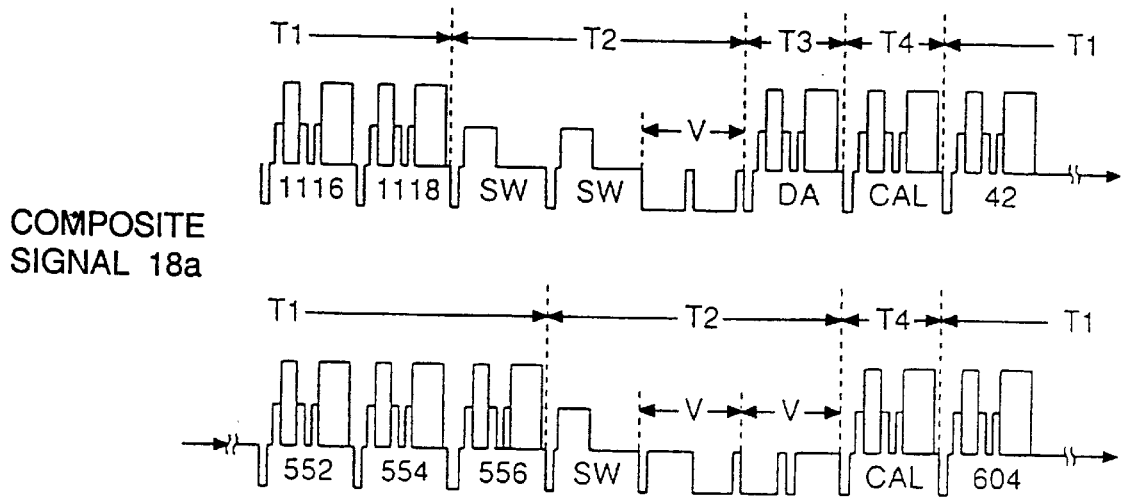
FIG. 7 is a diagram of the waveform of an even-line video signal in which a TCI information signal, a corrective signal, and other signals are interposed.

The switch 18 multiplexes the TCI signal 16a, the TCI information signal 20a, the corrective signal 21a, and the blanking signal 22a into a composite signal 18a. As shown in FIG. 7, during every period T1, the switch 18 selects the TCI signal 16a representing display picture information. During every period T2, the switch 18 selects the blanking signal 22a which contains the switching signal and the vertical sync signal. During every period T3, the switch 18 selects the TCI information signal 20a. During every period T4, the switch 18 selects the corrective signal 21a. As shown in FIG. 7, a sequence of periods T2, T3, and T4 extends between a period Ti ending at picture information of the 1118-th line of a preceding frame and a period Ti starting from picture information of the 42-nd line of a present frame. In addition, a sequence of periods T2 and T4 extends between a period T1 ending at picture information of the 556-th line and a period T1 starting from picture information of the 604-th line. In FIG. 7, "SW" denotes a switching signal 22a for providing a margin during which the recording heads are switched or changed, and "V" denotes a vertical sync signal 22a. In addition, "DA" denotes the TCI information signal 20a, and "CAL" denotes the corrective signal (calibration signal) 21a.

The switch 19 receives the TCI information signal 20a from the information signal generator 20. The switch 19 receives the corrective signal (calibration signal) 21a from the corrective signal generator (calibration signal generator) 21. The switch 19 receives the blanking signal 22a from the blanking signal generator 22. The blanking signal 22a contains the switching signal and the vertical sync signal.

Figure 8:
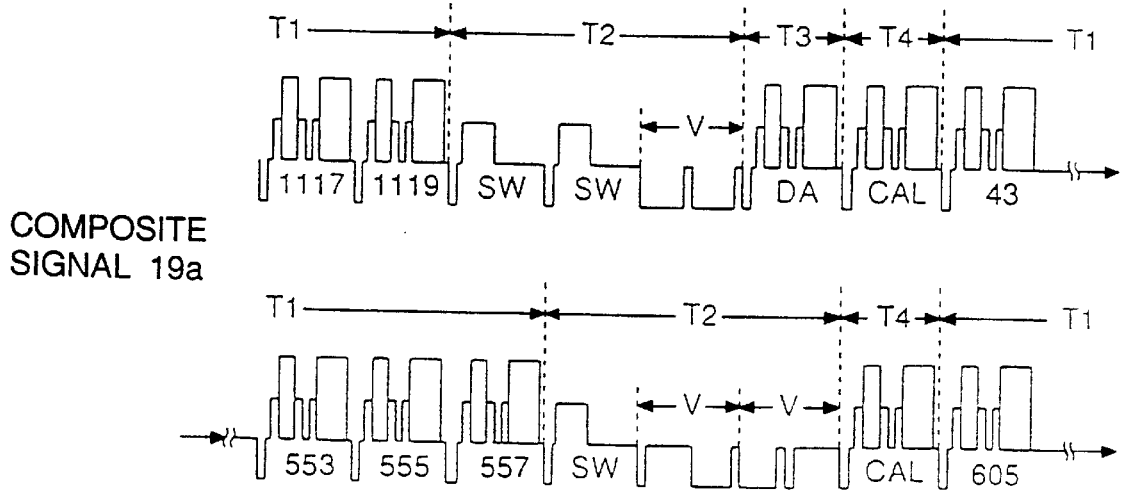
FIG. 8 is a diagram of the waveform of an odd-line video signal in which a TCI information signal, a corrective signal, and other signals are interposed.

The switch 19 multiplexes the TCI signal 17a, the TCI information signal 20a, the corrective signal 21a, and the blanking signal 22a into a composite signal 19a. As shown in FIG. 8, during every period Ti, the switch 19 selects the TCI signal 17a representing display picture information. During every period T2, the switch 19 selects the blanking signal 22a which contains the switching signal and the vertical sync signal. During every period T3, the switch 19 selects the TCI information signal 20a. During every period T4, the switch 19 selects the corrective signal 21a. As shown in FIG. 8, a sequence of periods T2, T3, and T4 extends between a period T1 ending at picture information of the 1119-th line of a preceding frame and a period Ti starting from picture information of the 43-rd line of a present frame. In addition, a sequence of periods T2 and T4 extends between a period T1 ending at picture information of the 557-th line and a period T1 starting from picture information of the 605-th line. In FIG. 8, "SW" denotes a switching signal 22a for providing a margin during which the recording heads are switched or changed, and "V" denotes a vertical sync signal 22a. In addition, "DA" denotes the TCI information signal 20a, and "CAL" denotes the corrective signal (calibration signal) 21a.

The information signal generator 20 will now be described. As shown in FIG. 5, the information signal generator 20 includes a time code signal generator 200 containing counters for generating a time code signal 200a. As shown in FIG. 3, the time code signal 200a has 32 bits separated into four 8-bit words. The first word of the time code signal 200a is reset to "0" when an input HD signal starts to be recorded. The first word of the time code signal 200a is incremented by "1" in response to recording of every frame. The other words of the time code signal 200a contain information of "second", "minute", and "hour" which is generated in a suitable way. The time code signal 200a is fed to a divider 201 and an error correction signal generator 204.

The divider 201 serves to specify the relation between the type of the corrective signal (calibration signal) 21a and the time code signal 200a. The maximum number of different types of the corrective signal 21a is set to a predetermined natural number Q equal to 2 or more. The number of actually-used different types of the corrective signal 21a is set to a predetermined natural number R equal to or smaller than Q. In the embodiment, the number Q is equal to 5. The divider 201 divides the first word of the time code signal 200a (which represents the frame number) by the number Q and generates a first control signal 201a representing the remainder of the division. Since the number Q is equal to 5. the first control signal 201a is changeable among states corresponding to "0", "1", "2", "3", and "4". The divider 201 outputs the first control signal 201a to a data signal generator 202 and a selector or switch 213 in the corrective signal generator (calibration signal generator) 21. The data signal generator 202 receives the first control signal 201a and the output signal 4a of the A/D converter 4. The data signal generator 202 extracts the information signal from the output signal 4a of the A/D converter 4. Specifically, the data signal generator 202 discriminates the information signal from other signals by using a given level (for example, a maximum level of a horizontal sync signal) as a threshold value. The data signal generator 202 subjects the information signal to error detection and correction. The data signal generator 202 changes the data signal in the information signal into a new data signal 202a by updating the program ID information, the editing information, the corrective signal information, and others therein. The data signal generator 202 outputs the new data signal 202a to the error signal generator 204. An audio identification (discrimination) signal "vv" is contained in the data signal 202a. The data signal generator 202 receives the audio identification signal "vv" from a suitable device (not shown). The corrective signal information is used in discrimination between the presence and the absence of a corrective signal (calibration signal). Three different types of the corrective signal are prepared in the corrective signal generator 21. The first type, the second type, and the third type of the corrective signal are selected in the corrective signal generator 21 when the first control signal 201a assumes states of "0", "1", and "2" respectively. The corrective signal is not recorded when the first control signal 201a assumes one of states of "3" and "4". Accordingly, the data signal generator 202 sets the corrective signal information to "1" when the first control signal 201a assumes one states of "0", "1", and "2". In addition, the data signal generator 202 sets the corrective signal information to "0" when the first control signal 201a assumes one of states of "3" and "4". In the absence of an information signal from the signal segments corresponding to the 603-rd line and the 604-th line (for example, in the case where an input HD signal agrees with a broadcasting HD signal), the data signal generator 202 produces a data signal 202a in response to the output signal of a discrimination circuit (not shown) for discriminating information, such as information of the type of the video signal and the type of the audio signal, which is necessary in data signal generation.

The error correction signal generator 204 receives the time code signal 200a and the data signal 202a, and generates words of a Reed-Solomon code (an error correction signal) in response to the signals 200a and 202a. The error correction signal generator 204 adds the generated code words (the error correction signal) to the time code signal 200a and the data signal 202a. The error correction signal generator 204 outputs the addition-resultant signal to a modulator 206.

An added-signal generator 205 produces a preamble signal and a sync signal, and outputs the preamble signal and the sync signal to the modulator 206.

Figure 9:
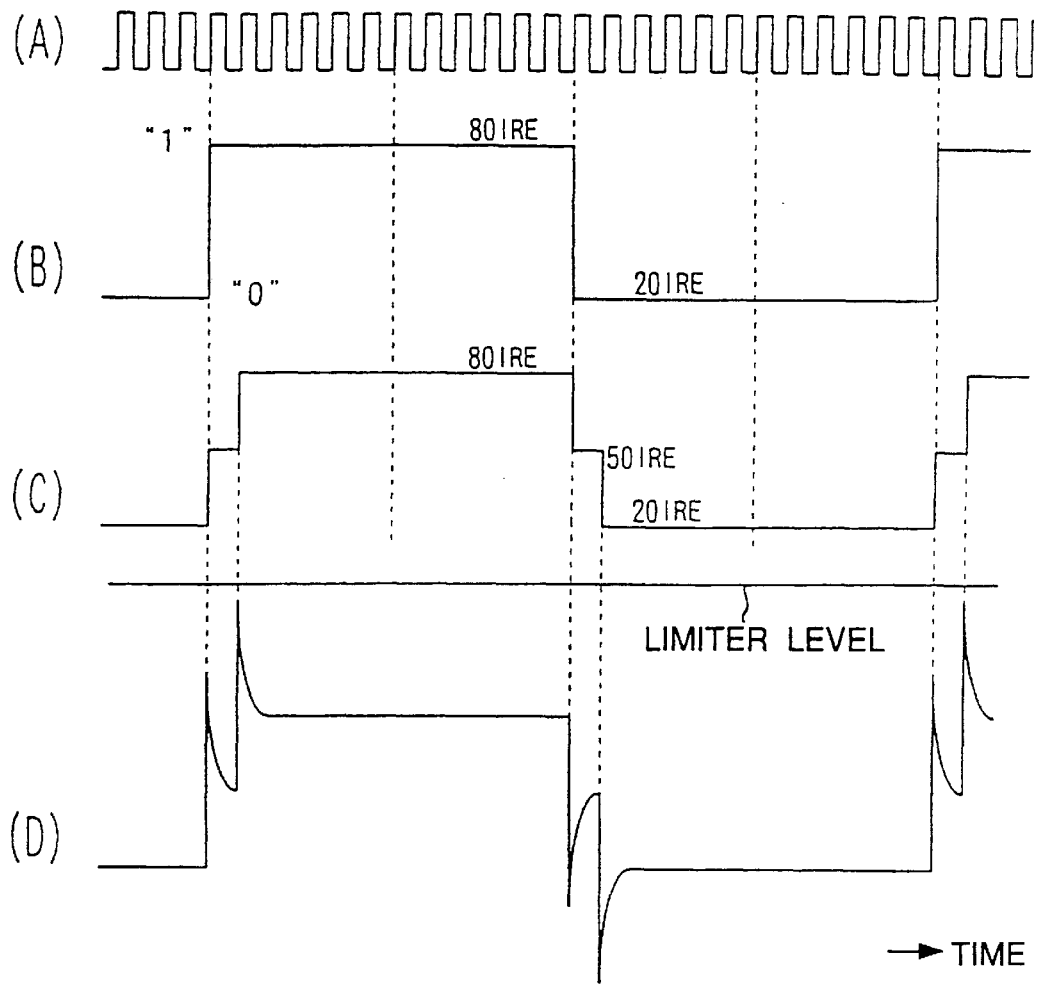
FIG. 9 is a diagram of the waveforms of various signals in the apparatus of FIG. 5.

The output signal of the error correction signal generator 204 and the output signal of the added-signal generator 205, which are received by the modulator 206, agree with 2-value signals changeable between two levels corresponding to "0" and "1" in time domain. The modulator 206 converts the received 2-value signals into 3-value signals while combining the received 2-value signals. This conversion is to prevent the levels of the related signals from exceeding limiter levels in limiters 27 and 28. Specifically, the modulator 206 uses a clock signal having a waveform such as shown in the portion (A) of FIG. 9. A sum of six periods of the clock signal corresponds to one bit of a received signal (the output signal of the error correction signal generator 204 or the added-signal generator 205) which has a waveform such as shown in the portion (B) of FIG. 9. The level of the received signal is changeable between 20 IRE and 80 IRE corresponding to logic states of "0" and "1" respectively. The modulator 206 executes the following modulation process. In the case of the "0" state of the received signal which is preceded by the "1" state, that is, in the case where the received signal has just changed from "1" to "0", the level of the modulation-resultant signal changes as 50 IRE, 20 IRE, 20 IRE, 20 IRE, 20 IRE, and 20 IRE at respective sample moments in six periods of the clock signal as shown in the portion (C) of FIG. 9. In the case of the "1" state of the received signal which is preceded by the "0" state, that is, in the case where the received signal has just changed from "0" to "1", the level of the modulation-resultant signal changes as 50 IRE, 80 IRE, 80 IRE, 80 IRE, 80 IRE, and 80 IRE at respective sample moments in six periods of the clock signal as shown in the portion (C) of FIG. 9. In the case of the "1" state of the received signal which is preceded by the "1" state, that is, in the case where the received signal has remained "1" during two bits, the level of the modulation-resultant signal keeps unchanged as 80 IRE, 80 IRE, 80 IRE, 80 IRE, 80 IRE, and 80 IRE at respective sample moments in six periods of the clock signal. In the case of the "0" state of the received signal which is preceded by the "0" state, that is, in the case where the received signal has remained "0" during two bits, the level of the modulation-resultant signal keeps unchanged as 20 IRE, 20 IRE, 20 IRE, 20 IRE, 20 IRE, and 20 IRE at respective sample moments in six periods of the clock signal. Thus, an intermediate level of 50 IRE is inserted in a level change of the received signal between 20 IRE and 80 IRE. The insertion of the intermediate level of 50 IRE reduces a rate of a level change of the modulation-resultant signal so that the level of the related output signal of an emphasis section 25 or 26 can be prevented from exceeding a limiter level in the limiter 27 or 28 as shown in the portion (D) of FIG. 9. The respective values of the 3-value signal correspond to 20 IRE, 50 IRE, and 80 IRE. The modulator 206 outputs the modulation-resultant signal to a switch or selector 207.

The emphasis sections 25 and 26 emphasize high-frequency signal components, and hence cause greater spike levels at time positions corresponding to display picture portions immediately after edges in a display picture. The conversion of the 2-value signal into the 3-value signal by the modulator 206 suppresses such spike levels, thereby preventing the loss of edge information which would occur when the signal level exceeds the limiter level in the limiter 27 or 28.

A level reference signal generator 203 produces a level reference signal with a predetermined normal reference level (50 IRE). The level reference signal is outputted from the generator 203 to the switch 207. A sync signal generator (not shown) produces a sync signal which is fed to the switch 207.

Figure 10:
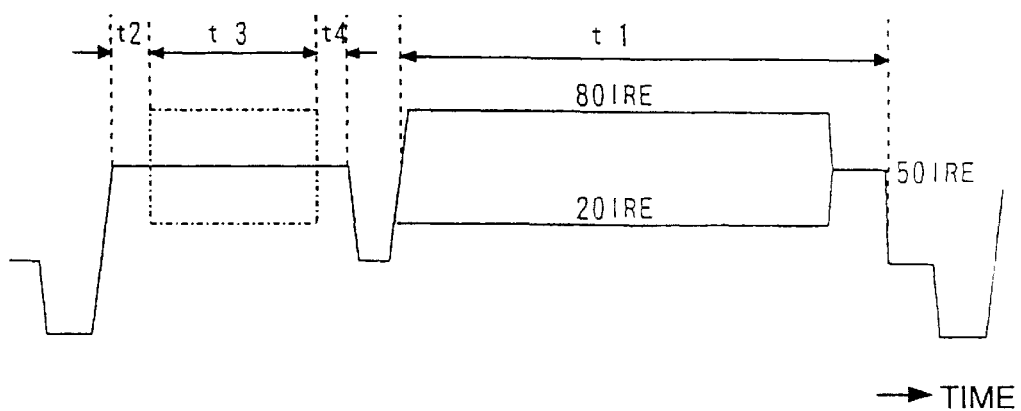
FIG. 10 is a diagram of the waveform of a TCI information signal in the apparatus of FIG. 5.

The switch 207 time-division-multiplexes the output signal of the modulator 206, the level reference signal, and the sync signal into a TCI information signal 20a which has a waveform such as shown in FIG. 10. The information signal interposed in the 603-rd or 604-th line segment of the Y signal "aa" is time-base-compressed into a segment of the TCI information signal 20a which occupies a period t1 in FIG. 10. The rate of compression of the information signal is set equal to the rate of compression of the Y signal "aa".

Information signal may be interposed in at least one of the PB signal "bb" and the PR signal "cc".

The corrective signal generator (calibration signal generator) 21 will now be described. As shown in FIG. 5, the corrective signal generator 21 includes ROM's 210, 211, and 212 storing first, second, and third predetermined corrective signals (first, second, and third predetermined calibration signals) 210a, 211a, and 212a respectively. The first, second, and third corrective signals 210a, 211a, and 212a agree with the first type, the second type, and the third type of the corrective signal 21a respectively. The corrective signal generator 21 also includes a switch or selector 213 receiving the corrective signals 210a, 211a, and 212a from the ROM's 210, 211, and 212. The switch 213 receives a sync signal and a blanking signal from ROM's (not shown). The blanking signal has a pedestal level. As previously described, the switch 213 receives the first control signal 201a from the divider 201 in the information signal generator 20. The switch 213 selects one or more of the corrective signals 210a, 211a, and 212a, the sync signal, and the blanking signal in response to the first control signal 201a, and transmits the selected signal or signals to the switches 18 and 19. Specifically, the switch 213 selects the first corrective signal 210a when the first control signal 201a assumes "0". The switch 213 selects the second corrective signal 211a when the first control signal 201a assumes "1". The switch 213 selects the third corrective signal 212a when the first control signal 201a assumes "2". The switch 213 selects the sync signal and the blanking signal when the first control signal 201a assumes "3" and "4". Accordingly, the first control signal 201a determines and thus indicates the type of the currently-selected corrective signal. The corrective signals 210a, 211a, and 212a contain ramp signals for calibrating the linearities between the even-line processing system and the odd-line processing system, gray scale signals for adjusting the direct-current levels and the amplitude levels between the two systems, multi-burst signals for calibrating the frequency characteristics between the two systems, and 2T pulse signals for calibrating the phase characteristics between the two systems. For example, the 2T pulse signals have a sine-square form and a half width which equals a period of a frequency corresponding to a half of the related band.

The blanking signal generator 22 includes ROM's storing data representing the blanking signal 22a. The blanking signal generator 22 produces the blanking signal 22a which contains the switching signal and the vertical sync signal. The blanking signal generator 22 outputs the blanking signal 22a to the switches 18 and 19. As previously described, the blanking signal 22a which contains the switching signal "SW" and the vertical sync signal "V" is inserted during the periods T2 in FIGS. 7 and 8.

As previously described, the switch 18 multiplexes the TCI signal 16a, the TCI information signal 20a, the corrective signal 21a, and the blanking signal 22a into a composite signal 18a. The switch 18 outputs the composite signal 18a to a D/A converter 23. The composite signal 18a is changed into a corresponding analog signal by the D/A converter 23.

As previously described, the switch 19 multiplexes the TCI signal 17a, the TCI information signal 20a, the corrective signal 21a, and the blanking signal 22a into a composite signal 19a. The switch 19 outputs the composite signal 19a to a D/A converter 24. The composite signal 19a is changed into a corresponding analog signal by the D/A converter 24.

The emphasis sections 25 and 26 receive the output signals of the D/A converters 23 and 24 respectively. The emphasis sections and 26 emphasize high-frequency components of the received signals in a horizontal direction, and output the emphasis-resultant signals to the limiters 27 and 28 respectively. The devices 27 and 28 limit the amplitudes of the emphasis-resultant signals with respect to predetermined limiter levels. FM modulators 29 and 30 receive the output signals of the limiters 27 and 28, and subject the received signals to frequency modulation of a given deviation respectively. The output signal of the FM modulator 29 is fed via a recording amplifier (not shown) to magnetic heads (video heads) 1A and 1B before being recorded on a magnetic tape TT thereby. The output signal of the FM modulator 30 is fed via a recording amplifier (not shown) to magnetic heads (video heads) 2A and 2B before being recorded on the magnetic tape TT thereby. The magnetic heads 1A, 1B, 2A, and 2B are mounted on a rotary drum.

The signal record pattern on the magnetic tape TT will now be described with reference to FIGS. 11 and 12, in which the numerals denote the line order numbers; "SW" denotes a switching signal; "V" denotes a vertical sync signal; "CAL" denotes a corrective signal (calibration signal); and "DA" denotes a TCI information signal. As shown in FIGS. 11 and 12, the magnetic tape TT is provided with video and audio tracks for storing video information, audio information, and other information, and the video and audio tracks extend in directions oblique with respect to the magnetic tape.

With reference to FIG. 11, during the W mode of operation of the apparatus, the output signal of the FM modulator 29 which relates to the even-numbered lines is recorded on a video track between "SW" and "556(½)" via the magnetic head 1A. and is recorded on a video track between "556(½)" and "1118" via the magnetic head 1B. On the other hand, the output signal of the FM modulator 30 which relates to the odd-numbered lines is recorded on a video track between "SW" and "557(½)" via the magnetic head 2A, and is recorded on a video track between "557(½)" and "1119" via the magnetic head 2B. Two adjacent magnetic heads of the magnetic heads 1A, 1B, 2A, and 2B can simultaneously execute recording processes. As will be described later, magnetic heads (audio heads) 3A and 3B preceding the video heads 1A, 1B, 2A, and 2B form audio tracks "A" and "B" respectively.

The attachment heights of the magnetic heads 1A, 1B, 2A. 2B, 3A, and 3B may be modified so as to provide another signal record pattern on the magnetic tape TT which is shown in FIG. 12.

As previously described, during the W-NT mode of operation of the apparatus, an NTSC signal representative of one program is recorded on a magnetic tape driven at a long-term-corresponding speed. During the 2NT mode of operation of the apparatus, NTSC signals representative of two programs are recorded on a magnetic tape driven at the standard speed.

The W-NT mode of operation and the 2NT mode of operation will now be described in more detail. During the W-NT mode of operation, the tape running speed is set to one third of the standard tape running speed, and an NTSC signal is subjected to given processing and then 1-field segments of the resultant NTSC signal are recorded on respective tracks on the magnetic tape. During the 2NT mode of operation, the tape running speed is set to the standard tape running speed, and NTSC signals of two programs are subjected to given processing and then 1-field segments of the resultant NTSC signals are recorded on respective video tracks shown in FIGS. 11 and 12. With reference to FIG. 5, the recording section of the signal recording and reproducing apparatus includes AGC sections 10 and 11. A first NTSC signal "dd" is fed to the AGC section 10 from a transmission line (not shown). A second NTSC signal "ee" is fed to the AGC section 11 from a transmission line (not shown). The AGC sections 10 and 11 adjust the amplitude levels of the NTSC signals "dd" and "ee" in response to output signals 12a and 13a from A/D converters 12 and 13 which relates to the level reference signals in information signals IS. The adjustment-resultant NTSC signals "dd" and "ee", that is, the output signals of the AGC sections 10 and 11, are fed to the A/D converters 12 and 13 respectively, and are converted into corresponding digital signals thereby. The digital NTSC signals, that is, the output signals 12a and 13a of the A/D converters 12 and 13, are fed to signal converters 14 and 15 respectively. The signal converter 14 changes the output signal 12a of the A/D converter 12 into third Y, PB, and PR signals 14a, 14b, and 14c through given signal processing. The signal converter 14 outputs the third Y, PB, and PR signals 14a, 14b, and 14c to the switch 8. The signal converter 15 changes the output signal 13a of the A/D converter 13 into fourth Y, PB, and PR signals 15a, 15b, and 15c through given signal processing. The signal converter 15 outputs the fourth Y, PB, and PR signals 15a, 15b, and 15c to the switch 9.

It should be noted that the AGC section 11, the A/D converter 13, and the signal converter 15 which relate to the second NTSC signal "ee" are active during the 2NT mode of operation but are inactive during the W-NT mode of operation. On the other hand, the AGC section 10, the A/D converter 12, and the signal converter 14 which relate to the first NTSC signal "dd" are active during both the 2NT mode of operation and the W-NT mode of operation.

The switch 8 selects the third Y, PB, and PR signals 14a, 14b, and 14c, and transmits the selected signals to the TCI converter 16.

The switch 9 selects the fourth Y, PB, and PR signals 15a, 15b, and 15c, and transmits the selected signals to the TCI converter 17.

The TCI converter 16 compresses the third PB and PR signals 14b and 14c into compressed PB and PR signals with respect to time base. In addition, the TCI converter 16 compresses the third Y signal 14a into a compressed Y signal with respect to time base.

Then, the TCI converter 16 multiplexes the compressed Y, PB, and PR signals into a TCI signal 16a. The TCI converter 16 outputs the TCI signal 16a to the switch 18.

The TCI converter 17 compresses the fourth PB and PR signals 15b and 15c into compressed PB and PR signals with respect to time base. In addition, the TCI converter 17 compresses the fourth Y signal 15a into a compressed Y signal with respect to time base. Then, the TCI converter 17 multiplexes the compressed Y, PB, and PR signals into a TCI signal 17a. The TCI converter 17 outputs the TCI signal 17a to the switch 19.

Figure 13:
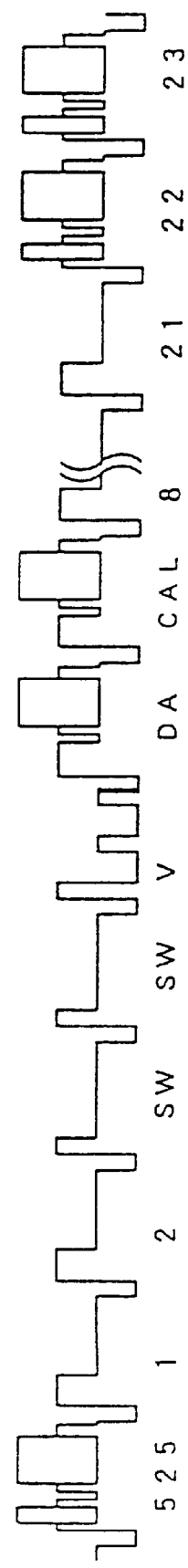
FIG. 13 is a diagram of the waveform of a first-field video signal in which a TCI signal, a corrective signal, and other signals are interposed.
Figure 14:
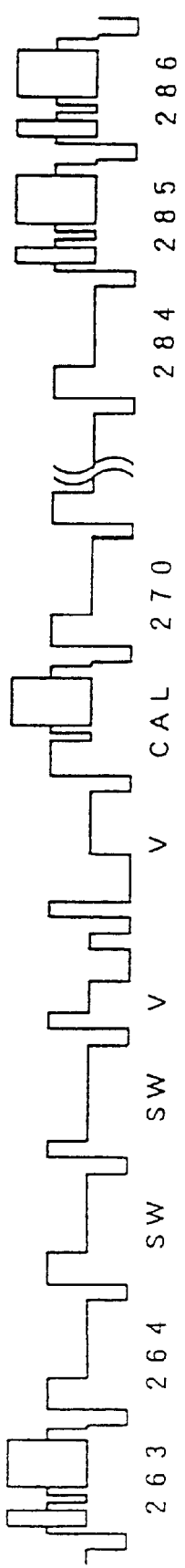
FIG. 14 is a diagram of the waveform of a second-field video signal in which a corrective signal, and other signals are interposed.

The switch 18 multiplexes the TCI signal 16a, the TCI information signal 20a, the corrective signal 21a, and the blanking signal 22a into a composite signal 18a having a waveform such as shown in FIGS. 13 and 14. It should be noted that, in these drawings, "SW" denotes a switching signal 22a for providing a margin during which the recording heads are switched or changed, and "V" denotes a vertical sync signal 22a. In addition, "DA" denotes the TCI information signal 20a, and "CAL" denotes the corrective signal (calibration signal) 21a. As shown in FIG. 13, the switch 18 replaces the portion of the TCI signal 16a, which corresponds to the 3-rd line to the 7-th line, by a sequence of two switching signals "SW", a vertical sync signal "V", a TCI information signal "DA", and a corrective signal "CAL". As shown in FIG. 14, the switch 18 replaces the portion of the TCI signal 16a, which corresponds to the 265-th line to the 269-th line, by a sequence of two switching signals "SW", two vertical sync signals "V", and a corrective signal "CAL". The switch 18 selects and passes the other portions of the TCI signal 16a.

The switch 19 multiplexes the TCI signal 17a, the TCI information signal 20a, the corrective signal 21a, and the blanking signal 22a into a composite signal 19a having a waveform such as shown in FIGS. 13 and 14. Operation of the switch 19 is similar to operation of the switch 18, and thus description thereof will be omitted.

The composite signal 18a is transmitted from the switch 18 to the magnetic heads 1A and 1B via the devices 23, 25, 27. and 29 before being recorded on the magnetic tape TT thereby. The composite signal 19a is transmitted from the switch 19 to the magnetic heads 2A and 2B via the devices 24, 26, 28, and 30 before being recorded on the magnetic tape TT thereby.

Figure 15:
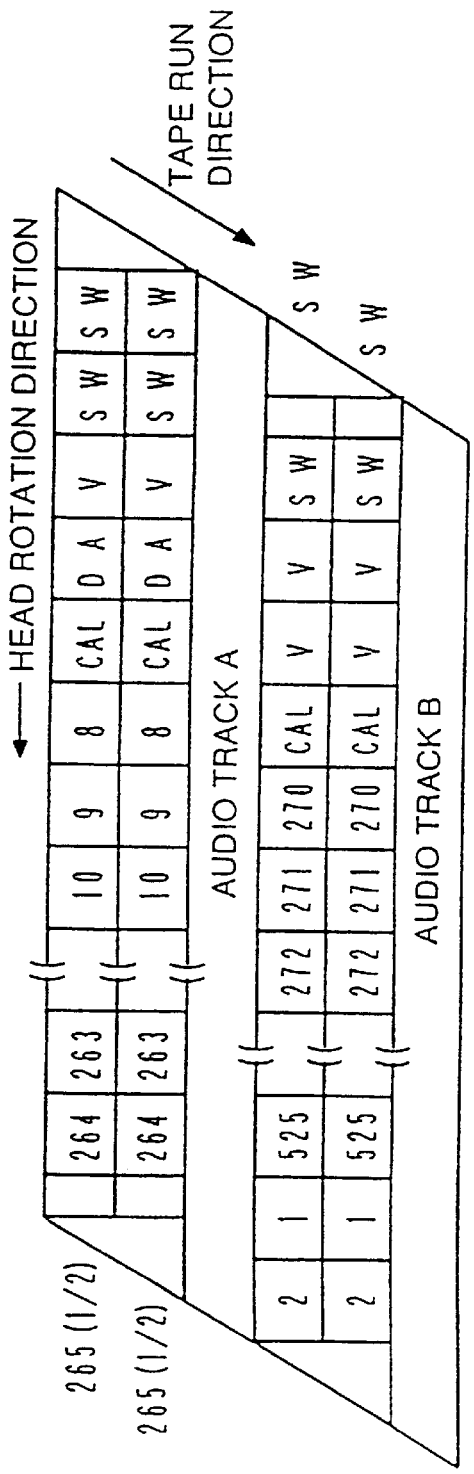
FIG. 15 is a diagram of a signal record pattern on a magnetic tape which occurs during a 2NT mode of operation of the apparatus in FIG. 5.
Figure 16:
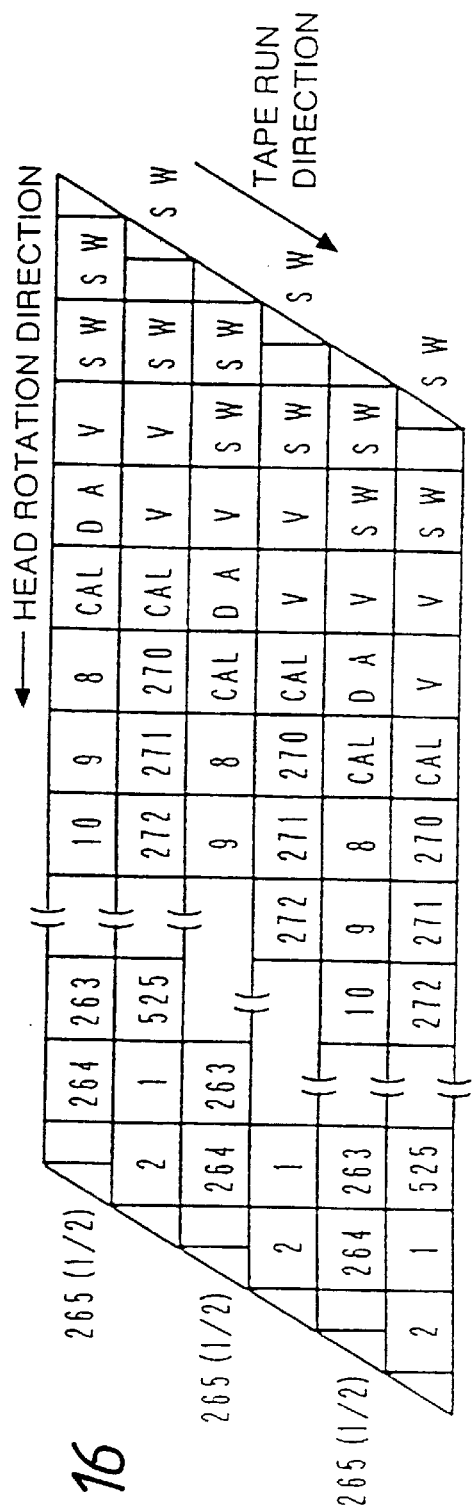
FIG. 16 is a diagram of a signal record pattern on a magnetic tape which occurs during a W-NT mode of operation of the apparatus in FIG. 5.

FIG. 15 shows the signal record pattern of the magnetic tape TT which occurs during the 2NT mode of operation. FIG. 16 shows the signal record pattern of the magnetic tape TT which occurs during the W-NT mode of operation. In FIGS. 15 and 16: the numerals denote the line order numbers; "SW" denotes a switching signal; "V" denotes a vertical sync signal; "CAL" denotes a corrective signal (calibration signal); and "DA" denotes a TCI information signal.

The recording of an audio signal will now be described.

During the W mode of operation of the apparatus, an information signal in an input HD signal contains audio identification information representing the type of a related audio signal (the stereophonic type, the monophonic type, or the bilingual type). The information signal is separated from the output signal 4a of the A/D converter 4, and is then fed to the information signal generator 20. As previously described, the information signal generator 20 places the information signal in the TCI information signal 20a. Then, the TCI information signal 20a is processed by the devices 18, 19, 23, 24, 25, 26, 27, 28, 29, and 30 before being recorded via the magnetic heads 1A, 1B, 2A, and 2B on the magnetic tape TT as a signal "DA" in FIG. 11.

With reference to FIG. 5, an input audio signal "ww" of the right channel is fed to an audio signal recording processor 80. In addition, an input audio signal "xx" of the left channel is fed to an audio signal recording processor 81. Each of the audio signal recording processors 80 and 81 includes an amplifier (not shown) acting on the input audio signal, a noise reduction circuit (not shown) acting on the output signal of the amplifier, and a preemphasis circuit (not shown) which emphasizes high-frequency components of the output signal of the noise reduction circuit. The output signal of the audio signal recording processor 80, that is, the output signal of the preemphasis circuit therein, is fed to an FM modulator 82, and is converted thereby into an FM audio signal having a central frequency of 1.7 MHz and a frequency deviation of ±150 kHz. The output signal of the audio signal recording processor 81, that is, the output signal of the preemphasis circuit therein, is fed to an FM modulator 83, and is converted thereby into an FM audio signal having a central frequency of 1.3 MHz and a frequency deviation of ±150 kHz. The FM audio signals are transmitted from the FM modulators 82 and 83 to an adder 84 via level adjusters (not shown), being combined by the adder 84 into a multiplexed FM audio signal. During the W mode of operation of the apparatus, the multiplexed FM audio signal is fed from the adder 84 to the magnetic heads 3A and 3B, and is recorded thereby on audio tracks "A" and "B" on the magnetic tape TT in FIG. 11.

In the case of a broadcasting MUSE signal, a MUSE decoder (not shown) separates the MUSE signal into input Y, PB, and PR signals "aa", "bb", and "cc" and an audio identification signal "vv".

The audio identification signal "vv" is generated from information interposed in a segment of the MUSE signal which corresponds to a given line of every frame. The input Y, PB, and PR signals "aa", "bb", and "cc" and the audio identification signal "vv" are fed to the signal recording and reproducing apparatus.

During the W-NT mode of operation of the apparatus, an NTSC signal "dd" is fed to the AGC section 10, and simultaneously audio identification information in the output signal 12a of the A/D converter 12 is fed to the data signal generator 202 in the information signal generator 20. In addition, input audio signals "ww" and "xx" of the right and left channels are fed to the audio signal recording processors 80 and 81 respectively.

During the W-NT mode of operation of the apparatus, the tape running speed is set to one third of the standard tape running speed, and the NTSC signal is subjected to given processing and then 1-field segments of the resultant NTSC signal are recorded on respective tracks on the magnetic tape TT as shown in FIG. 16. The information signal generator 20 places the audio identification information in the TCI information signal 20a. Then, the TCI information signal 20a is processed by the devices 18, 23, 25, 27, and 29 before being recorded via the magnetic heads 1A and 1B on the magnetic tape TT as a signal "DA" in FIG. 16. On the other hand, the input audio signals "ww" and "a" are processed by the audio signal recording processors 80 and 81 respectively. The output signals of the audio signal recording processors 80 and 81 are converted by the FM modulators 82 and 83 into FM audio signals having central frequencies of 1.7 MHz and 1.3 MHz and a frequency deviation of ±150 kHz. The FM audio signals are combined by the adder 84 into a multiplexed FM audio signal. During the W-NT mode of operation of the apparatus, the multiplexed FM audio signal is recorded by the magnetic heads 3A and 3B into deep layer portions of the magnetic tape TT.

During the 2NT mode of operation of the apparatus, first and second NTSC signals "dd" and "ee" are fed to the AGC sections 10 and 11 respectively, and simultaneously audio identification information in the output signals 12a and 13a of the A/D converters 12 and 13 is fed to the data signal generator 202 in the information signal generator 20. In addition, input audio signals "ww" and "xx" of the right and left channels are fed to the audio signal recording processors 80 and 81 respectively.

During the 2NT mode of operation of the apparatus, the tape running speed is set to the standard tape running speed, and the NTSC signals are subjected to given processing and then 1-field segments of the resultant NTSC signals are recorded on respective video tracks on the magnetic tape TT as shown in FIG. 11. The information signal generator 20 places the audio identification information in the TCI information signal 20a. Then, the TCI information signal 20a is processed by the devices 18, 19, 23, 24, 25, 26, 27, 28, 29, and 30 before being recorded via the magnetic heads 1A, 1B, 2A, and 2B on the magnetic tape IT as a signal "DA" in FIG. 15. On the other hand, the input audio signals "ww" and "xx" related to the first program (the first NTSC signal "dd") are processed by the audio signal recording processors 80 and 81 respectively. The output signals of the audio signal recording processors 80 and 81 are converted by the FM modulators 82 and 83 into FM audio signals having central frequencies of 1.7 MHz and 1.3 MHz and a frequency deviation of ±150 kHz. The input audio signals "ww" and "xx" related to the second program (the second NTSC signal "ee") are processed by audio signal recording processors (not shown) respectively. The output signals of the audio signal recording processors are converted by FM modulators (not shown) into FM audio signals having central frequencies of 2.7 MHz and 2.3 MHz and a frequency deviation of ±150 kHz. The FM audio signals related to the first program and the FM audio signals related to the second program are combined by the adder 84 into a multiplexed FM audio signal. During the 2NT mode of operation of the apparatus, the multiplexed FM audio signal is recorded by the magnetic heads 3A and 3B on audio tracks of the magnetic tape TT.

The audio identification signal "vv" and the input audio signals "ww" and "xx" are fed to the signal recording and reproducing apparatus while the input NTSC signal or signals are fed thereto. In Japanese ground-wave TV broadcasting, a sub carrier AM-modulated with an audio mode signal is multiplexed with a main carrier for frequency modulation of an audio signal, and the resultant audio signal and an NTSC signal are combined into a television signal. The sub carrier is separate from the main carrier by a frequency of about 55 kHz. The audio mode signal is either a stereophonic audio mode signal with a frequency of 982.5 Hz or a bilingual audio mode signal with a frequency of 922.5 Hz. The absence of the stereophonic audio mode signal and the bilingual audio mode signal indicates that the related audio signal is of the monophonic type.

During the W-NT mode of operation of the apparatus, a tuner (not shown) divides a received television signal into an NTSC signal "dd", input audio signals "ww" and "xx", and an audio identification signal "vv". The audio identification signal "vv" is derived from the audio mode signal in the received television signal. The NTSC signal "dd", the input audio signals "ww" and "xx", and the audio identification signal "vv" are fed to the apparatus via transmission lines (not shown).

During the 2NT mode of operation of the apparatus, a first tuner (not shown) divides a first received television signal (a first program) into a first NTSC signal "dd", input audio signals "ww" and "xx", and an audio identification signal "vv". The audio identification signal "vv" is derived from the audio mode signal in the received television signal. The first NTSC signal "dd", the input audio signals "ww" and "xx", and the audio identification signal "vv" are fed to the apparatus via transmission lines (not shown). At the same time, a second tuner (not shown) divides a second received television signal (a second program) into a second NTSC signal "ee", input audio signals "ww" and "xx", and an audio identification signal "vv". The audio identification signal "vv" is derived from the audio mode signal in the received television signal. The second NTSC signal "ee", the input audio signals "ww" and "xx", and the audio identification signal "vv" are fed to the apparatus via transmission lines (not shown).

Reproducing Side

A reproducing side (reproducing system) of the signal recording and reproducing apparatus operates in one of the W mode, the W-NT mode, and the 2NT mode. Operation of the reproducing side of the apparatus can be changed among the W mode, the W-NT mode, and the 2NT mode.

Figure 17:
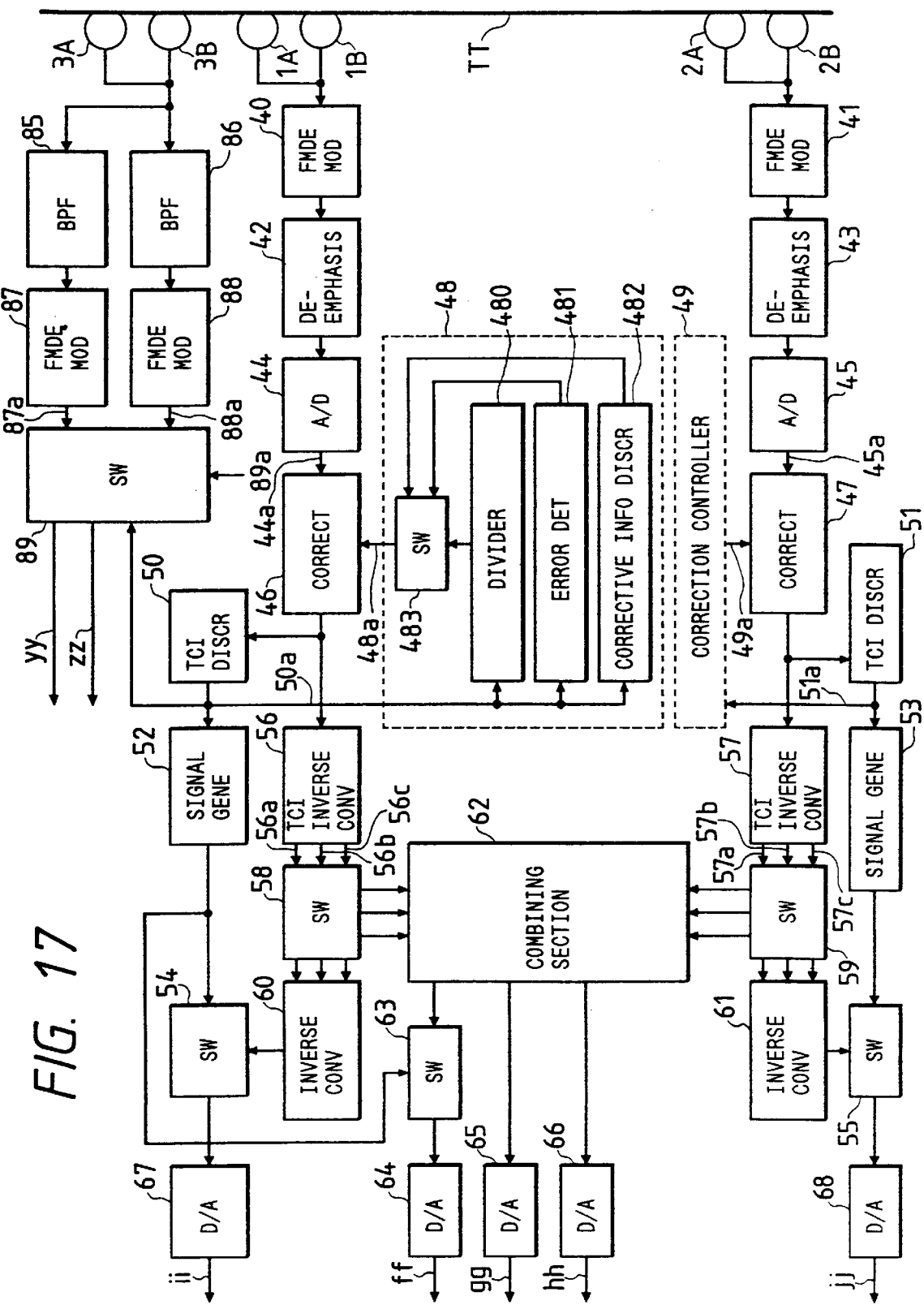
FIG. 17 is a block diagram of a reproducing side of the signal recording and reproducing apparatus according to the embodiment of this invention.

The W mode of operation of the apparatus will now be described in detail. With reference to FIG. 17, the reproducing side of the signal recording and reproducing apparatus includes an FM demodulator 40 following the magnetic heads 1A and 1B, and an FM demodulator 41 following the magnetic heads 2A and 2B. Signals are reproduced from the magnetic tape TT by the magnetic heads 1A, 1B, 2A, and 2B. The reproduced signals are fed via amplifiers (not shown) to the FM demodulators 40 and 41, being subjected to FM demodulation thereby. The demodulation-resultant signals, that is, the output signals of the FM demodulators 40 and 41, are fed to deemphasis sections 42 and 43 having functions inverse with respect to the functions of the emphasis sections 25 and 26 in the recording side of the apparatus. Specifically, the deemphasis sections 42 and 43 attenuate high-frequency components of the output signals of the FM demodulators 40 and 41 in a horizontal direction. The output signals of the deemphasis sections 42 and 43 are fed to A/D converters 44 and 45, being converted thereby into corresponding digital reproduced signals 44a and 45a. The A/D converters 44 and 45 outputs the digital reproduced signals 44a and 45a to correcting sections 46 and 47 respectively.

The correcting section 46 calibrates or corrects the reproduced signal 44a in response to a control signal 48a representing the type of the previously-indicated corrective signal (calibration signal) 21a. The control signal 48a will be described later. The correcting section 47 calibrates or corrects the reproduced signal 45a in response to a control signal 49a representing the type of the previously-indicated corrective signal (calibration signal) 21a. The control signal 49a will be described later. The reproducing section of the apparatus has a correcting structure which can deal with at least some of all the types of the corrective signals.

According to an example of correction responsive to the firsttype, the second-type, and the third-type corrective signals 210a. 211a, and 212a, the control signals 48a and 49a are fed to the corrective signal generator 21 in place of the first control signal 201a so that the corrective signal generator 21 produces and outputs an original corrective signal which corresponds to the currently-reproduced corrective signal. The original corrective signal and the corresponding reproduced corrective signal are compared in level by a comparator in the correcting section 46 or 47 to derive a difference therebetween, and the reproduced signal 44a or 45a is corrected in response to the resultant difference so that the corresponding reproduced corrective signal will be essentially equal to the original corrective signal in later frames. It should be noted that the types of the corrective signals generated by the recording side of the apparatus may be equal to or different from the types of the corrective signals used by the reproducing side of the apparatus.

The output signal of the correcting section 46 is fed to a TCI discriminator (TCI detector) 50 and a TCI inverse converter 56. The output signal of the correcting section 47 is fed to a TCI discriminator (TCI detector) 51 and a TCI inverse converter 57.

The TCI discriminator 50 extracts a TCI information signal 20a from the output signal of the correcting section 46. The TCI discriminator 50 samples and holds the level of the TCI information signal 20a which occurs during a period t2 or t3 in FIG. 10. The TCI discriminator 50 discriminates "0" and "1" in bits of the TCI information signal 20a while using the sampled and held level as a threshold value. The TCI discriminator 50 derives level information from a level reference signal in the TCI information signal 20a. The output signal 50a of the TCI discriminator 50 is fed to a correction controller 48 and a signal generator 52.

The TCI discriminator 51 extracts a TCI information signal 20a from the output signal of the correcting section 47. The TCI discriminator 51 samples and holds the level of the TCI information signal 20a which occurs during a period t2 or t3 in FIG. 10. The TCI discriminator 51 discriminates "0" and "1" in bits of the TCI information signal 20a while using the sampled and held level as a threshold value. The TCI discriminator 51 derives level information from a level reference signal in the TCI information signal 20a. The output signal 51a of the TCI discriminator 51 is fed to a correction controller 49 and a signal generator 53.

The correction controller 48 generates the control signal 48a in response to the output signal 50a of the TCI discriminator 50. The control signal 48a corresponds to the control signal 201a in the recording side of the apparatus, and indicates the type of the currently-reproduced corrective signal. The correction controller 48 includes a divider 480, an error detector 481, a corrective signal information detector 482, and a switch or selector 483. The divider 480 receives the output signal 50a of the TCI discriminator 50. Similarly to the operation of the divider 201 in the recording side of the apparatus, the divider 480 divides the first word of the time code signal 200a (which represents the frame number) in the signal 50a by the number Q (Q=5), and generates a primary control signal representing the remainder of the division. The divider 480 outputs the primary control signal to the switch 483. The error detector 481 receives the output signal 50a of the TCI discriminator 50. The error detector 481 decides whether the information signal in the signal 50a is accurate or wrong by referring to the error correction signal therein. When the information signal is decided to be wrong, the error detector 481 outputs a "0" signal to the switch 483. When the information signal is decided to be accurate, the error detector 481 outputs a "1" signal to the switch 483. The corrective signal information detector 482 receives the output signal 50a of the TCI discriminator 50. The corrective signal information detector 482 extracts the corrective signal information from the information signal in the signal 50a. When the corrective signal information indicates the absence of a corrective signal, the corrective signal information detector 482 outputs a "0" signal to the switch 483. When the corrective signal information indicates the presence of a corrective signal, the corrective signal information detector 482 outputs a "1" signal to the switch 483. In the case where both the output signals of the error detector 481 and the corrective signal information detector 482 are "1", the switch 483 passes the primary control signal to the correcting section 46 as the control signal 48a. In other cases, the switch 483 inhibits the transmission of the primary control signal to the correcting section 46. The correction controller 49 generates the control signal 49a in response to the output signal 51a of the TCI discriminator 51. The structure and operation of the correction controller 49 are similar to those of the correction controller 48.

The signal generator 52 expands the output signal 50a of the TCI discriminator 50 with respect to time base, and recovers the information signal therefrom. The TCI signal generator 52 outputs the recovered information signal to a switch or selector 63. The switch 63 interposes the information signal in a time segment of a Y signal which relates to the 603-rd line of every frame. The TCI inverse converters 56 and 57 have functions inverse with respect to the functions of the TCI converters 16 and 17 in the recording side of the apparatus. As previously described, the TCI inverse converter 56 receives the output signal of the correcting section 46 which contains the compressed line sequential color signals and the compressed luminance signal. The TCI inverse converter 56 expands the compressed line sequential color signals and the compressed luminance signal with respect to time base, and thereby returns them into the original line sequential color signals and the original luminance signal (the reproduced Y signal) 56a. The TCI converter 56 demodulates the original line sequential color signals into the reproduced PB and PR signals 56b and 56c. The TCI converter 56 outputs the reproduced Y, PB, and PR signals 56a, 56b, and 56c to a signal combining section 62 via a switch or selector 58. The reproduced Y, PB, and PR signals 56a, 56b, and 56c relate to the even-numbered lines of every frame.

As previously described, the TCI inverse converter 57 receives the output signal of the correcting section 47 which contains the compressed line sequential color signals and the compressed luminance signal. The TCI inverse converter 57 expands the compressed line sequential color signals and the compressed luminance signal with respect to time base, and thereby returns them into the original line sequential color signals and the original luminance signal (the reproduced Y signal) 57a. The TCI converter 57 demodulates the original line sequential color signals into the reproduced PB and PR signals 57b and 57c. The TCI converter 57 outputs the reproduced Y, PB, and PR signals 57a, 57b, and 57c to the signal combining section 62 via a switch or selector 59. The reproduced Y, PB, and PR signals 57a, 57b, and 57c relate to the odd-numbered lines of every frame.

The signal combining section 62 has a function inverse with respect to the function of the signal dividing section 7 in the recording side of the apparatus. The signal combining section 62 combines a set of the Y, PB, and PR signals 56a, 56b, and 56c and a set of the Y, PB, and PR signals 57a, 57b, and 57c into a set of the composite Y, PB, and PR signals. Specifically, the Y signal 56a and the Y signal 57a are combined into the composite Y signal. The PB signal 56b and the PB signal 57b are combined into the composite PB signal. The PR signal 56c and the PR signal 57c are combined into the composite PR signal.

The signal combing section 62 outputs the composite Y signal to the switch 63 by which the information signal is added to the 603-rd line segment of the composite Y signal. The switch 63 outputs the resultant Y signal to a D/A converter 64. The resultant Y signal is converted by the D/A converter 64 into an analog Y signal "ff". The D/A converter 64 outputs the analog Y signal "ff" to a transmission line (not shown). The signal combining section 62 outputs the composite PB signal to a D/A converter 65. The composite PB signal is converted by the D/A converter 65 into an analog PB signal "gg". The D/A converter 65 outputs the analog PB signal "gg" to a transmission line (not shown). The signal combining section 62 outputs the composite PR signal to a D/A converter 66. The composite PR signal is converted by the D/A converter 66 into an analog PR signal "hh". The D/A converter 66 outputs the analog PR signal "hh" to a transmission line (not shown).

The W-NT mode of operation of the apparatus will now be described. During the W-NT mode of operation, only apparatus portions related to the magnetic heads 1A and 1B are active, and an NTSC signal of one program is reproduced from the magnetic tape TT which is driven at the long-term-corresponding speed. The devices 1A, 1B, 40, 42, 44, 46, 48, 50, and 52 operate similarly to the operations thereof which occur during the W mode of operation of the apparatus.

During the W-NT mode of operation, the TCI inverse converter 56 receives the output signal of the correcting section 46 which contains the compressed Y, PB, and PR signals. The TCI inverse converter 56 expands the compressed Y, PB, and PR signals with respect to time base, and thereby returns them into the original Y, PB, and PR signals (the reproduced Y, PB, and PR signals). The TCI converter 56 outputs the reproduced Y, PB, and PR signals to an inverse signal converter 60 via the switch 58. The inverse signal converter 60 has a function inverse with respect to the function of the signal converter 14 in the recording side of the apparatus. The inverse signal converter 60 combines the reproduced Y, PB, and PR signals into a composite NTSC signal. The inverse signal converter 60 outputs the composite NTSC signal to a switch or selector 54. In addition, the TCI signal generator 52 outputs the recovered information signal to the switch 54. The switch 54 interposes the information signal in a time segment of the composite NTSC signal which relates to the 19-th line of every frame. The switch 54 outputs the resultant composite NTSC signal to a D/A converter 67. The resultant composite NTSC signal is converted by the D/A converter 67 into an analog NTSC signal "ii". The D/A converter 67 outputs the analog NTSC signal "ii" to a transmission line (not shown).

The 2NT mode of operation of the apparatus will now be described. During the 2NT mode of operation, NTSC signals of two programs are reproduced from the magnetic tape TT which is driven at the standard speed. The devices 1A, 1B, 2A, 2B, 40, 41, 42, 43, 44, 45, 46, 47, 48, 49, 50, 51, 52, and 53 operate similarly to the operations thereof which occur during the W mode of operation of the apparatus.

During the 2NT mode of operation, the TCI inverse converter 56 receives the output signal of the correcting section 46 which contains the first compressed Y, PB, and PR signals. The TCI inverse converter 56 expands the first compressed Y, PB, and PR signals with respect to time base, and thereby returns them into the first original Y, PB, and PR signals (the first reproduced Y, PB, and PR signals). The TCI converter 56 outputs the first reproduced Y, PB, and PR signals to the inverse signal converter 60 via the switch 58. The inverse signal converter 60 combines the first reproduced Y, PB, and PR signals into a first composite NTSC signal. The inverse signal converter 60 outputs the first composite NTSC signal to the switch 54. In addition, the TCI signal generator 52 outputs the recovered information signal to the switch 54. The switch 54 interposes the information signal in a time segment of the first composite NTSC signal which relates to the 19-th line of every frame. The switch 54 outputs the resultant first composite NTSC signal to the D/A converter 67. The resultant first composite NTSC signal is converted by the D/A converter 67 into a first analog NTSC signal "ii". The D/A converter 67 outputs the first analog NTSC signal "ii" to the transmission line (not shown).

During the 2NT mode of operation, the TCI inverse converter 57 receives the output signal of the correcting section 47 which contains the second compressed Y, PB, and PR signals. The TCI inverse converter 57 expands the second compressed Y, PB, and PR signals with respect to time base, and thereby returns them into the second original Y, PB, and PR signals (the second reproduced Y, PB, and PR signals). The TCI converter 57 outputs the second reproduced Y, PB, and PR signals to an inverse signal converter 61 via the switch 59. The inverse signal converter 61 has a function inverse with respect to the function of the signal converter 15 in the recording side of the apparatus. The inverse signal converter 61 combines the second reproduced Y, PB, and PR signals into a second composite NTSC signal. The inverse signal converter 61 outputs the second composite NTSC signal to a switch or selector 55. In addition, the TCI signal generator 53 outputs the recovered information signal to the switch 55. The switch 55 interposes the information signal in a time segment of the second composite NTSC signal which relates to the 19-th line of every frame. The switch 55 outputs the resultant second composite NTSC signal to a D/A converter 68. The resultant second composite NTSC signal is converted by the D/A converter 68 into a second analog NTSC signal "jj". The D/A converter 68 outputs the second analog NTSC signal "jj" to a transmission line (not shown).

Reproduction of an audio signal will now be described. FM audio signals of the right and left channels (the main and sub channels in the case of "bilingual") are reproduced from the magnetic tape TT by the audio heads 3A and 3B. The reproduced FM audio signals are fed to band pass filters 85 and 86 tuned to 1.7 MHz and 1.3 MHz respectively. The reproduced FM audio signals are separated from each other by the band pass filters 85 and 86. The reproduced FM audio signal of the right channel (the main channel in the case of "bilingual") is selected by the band pass filter 85 before being fed to an FM demodulator 87. The reproduced FM audio signal of the left channel (the sub channel in the case of "bilingual") is selected by the band pass filter 86 before being fed to an FM demodulator 88. The FM audio signals of the right and left channels are demodulated by the devices 87 and 88 into base-band reproduced audio signals 87a and 88a of the right and left channels which are fed to a switch or selector 89. The switch 89 receives the output signal 50a from the TCI discriminator 50 which contains the reproduced audio identification (discrimination) information. The switch 89 also receives audio control signal 89a which is generated by a suitable device (not shown) in response to operator's requirement. The switch 89 selects the reproduced audio signals 87a and 88a in response to the audio identification information 50a and the audio control signal 89a, and outputs the selected signals to transmission lines (not shown) as output audio signals "yy" and "zz".

In the case where the audio identification information 50a represents "bilingual", when the audio control signal 89a requires the main language, the switch 89 selects the main-channel audio signal 87a as the output audio signals "yy" and "zz". In the case where the audio identification information 50a represents "bilingual", when the audio control signal 89a requires the sub language, the switch 89 selects the sub-channel audio signal 88a as the output audio signals "yy" and "zz".

Figure 20:
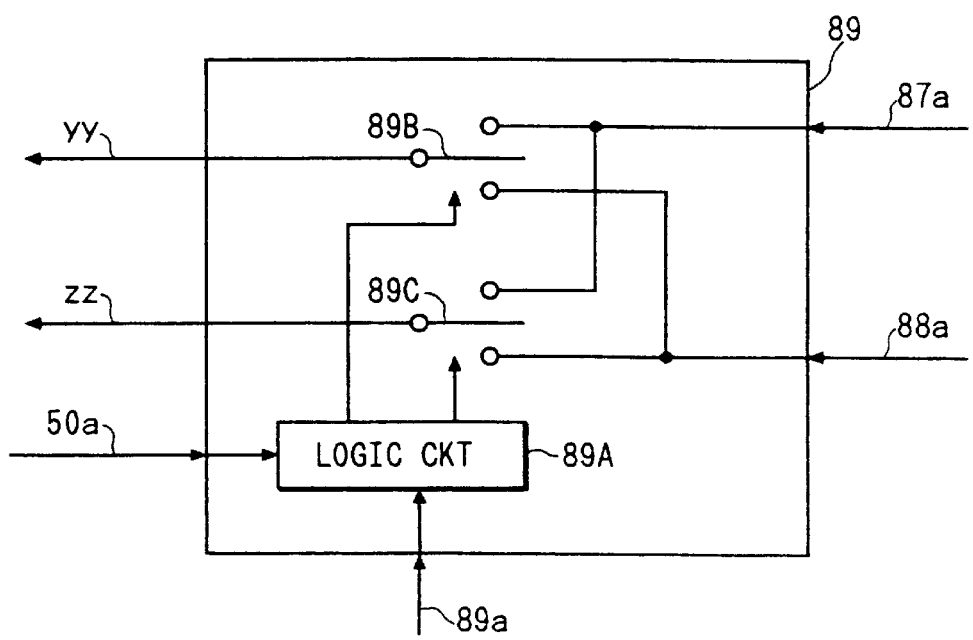
FIG. 20 is a block diagram of a switch in the apparatus of FIG. 17.

As shown in FIG. 20, the switch 89 includes a combination of a logic circuit 89A and switching sections 89B and 89C. The logic circuit 89A executes given logic operation between the audio identification information 50a and the audio control signal 89a. The switching section 89B selects one of the reproduced audio signals 87a and 88a as an output audio signal "yy" in response to an output signal of the logic circuit 89A. The switching section 89C selects one of the reproduced audio signals 87a and 88a as an output audio signal "zz" in response to an output signal of the logic circuit 89A.

As previously described, the audio identification information 50a represents the type of the audio signal (the stereophonic type, the monophonic type, or the bilingual type). Desired audio effects may be set for the stereophonic type, the monophonic type, and the bilingual type respectively. In this case, one of the desired audio effects which corresponds to the present audio-signal type is automatically selected and outputted in response to the audio identification information 50a.

Figure 18:
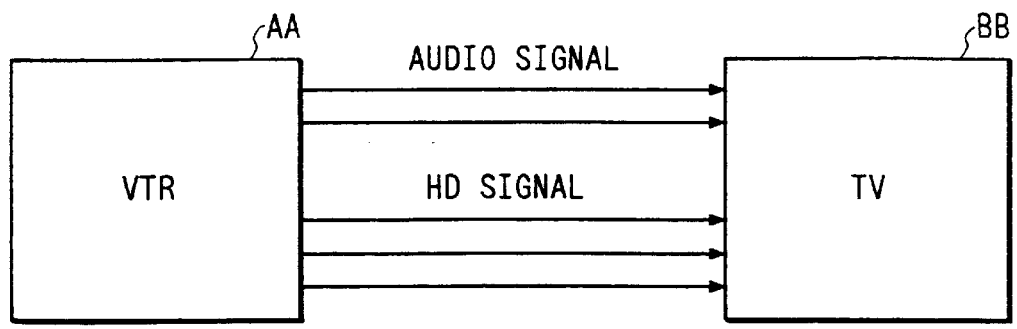
FIG. 18 is a block diagram of a combination of a VTR (video tape recorder) and a television set.

With reference to FIG. 18, a VTR (video tape recorder) AA includes the signal recording and reproducing apparatus of the embodiment. The VTR AA is connected to a picture display apparatus BB such as a TV set which contains a data line decoder.

The picture display apparatus BB is designed so that it can handle a bilingual audio signal. The data line decoder extracts the audio identification information from an output HD signal of the VTR AA.

In the case where the picture display apparatus BB is preset by the operator to output the main language, when the audio identification information indicates "bilingual", the picture display apparatus BB automatically selects the main language from an output audio signal of the VTR AA in response to the audio identification information and then outputs the selected main language.

Figure 19:
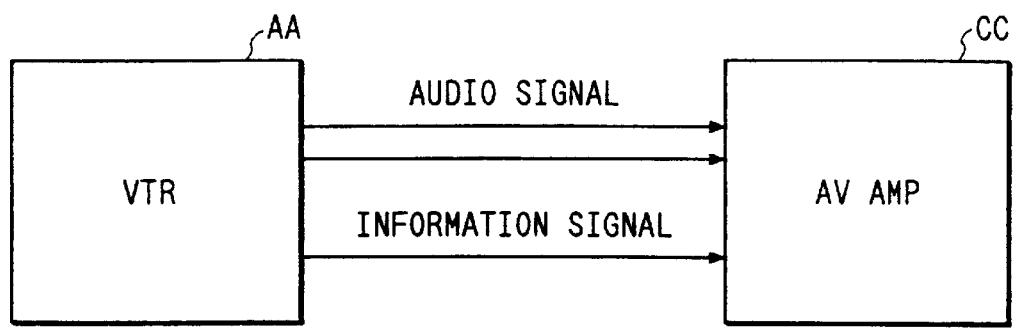
FIG. 19 is a block diagram of a combination of a VTR (video tape recorder) and an AV amplifier.

With reference to FIG. 19, a VTR (video tape recorder) AA includes the signal recording and reproducing apparatus of the embodiment. The VTR AA is connected to an AV (audio visual) amplifier CC which contains a data line decoder. The AV amplifier CC is designed so that it can provide a surround effect regarding a stereophonic audio signal. The data line decoder extracts the audio identification information from an output signal of the VTR AA. In the case where AV amplifier CC is preset by the operator to provide the surround effect, when the audio identification information indicates "stereophonic", the AV amplifier CC automatically implements the surround effect on the stereophonic audio signal in response to the audio identification information.

While the embodiment of this invention uses the dividers 201 and 480 to identify the types of the corrective signals in response to the time code signal, one of the corrective signals may be sequentially selected in response to the time code signal by other suitable arrangements. For example, a ROM storing the corrective signals may be used which is accessed in response to an address signal composed of the first word of the time code signal. In the case of two different corrective signals, it is sufficient to use only the lowest bit of the first word of the time code signal for sequential selection thereof.

While the TCI discriminator 50 and 51 processes the output signals of the correcting sections 46 and 47 in the embodiment of this invention, the TCI discriminator 50 and 51 may be modified to process the output signals of the A/D converters 44 and 45.

As previously described, the time code signal is reset to "0" at a recording start. The control signal 201a assumes "0" when the time code signal is "0". The gray scale signals for adjusting the direct-current levels and the amplitude levels between the even-line processing system and the odd-line processing system may be generated when the control signal 201a is "0". This design enables recording of the gray scale signals at a recording start.

The signal recording and reproducing apparatus of the embodiment may be modified to record and reproduce video information and audio information into and from a recording medium such as an optical disk, a floppy disk, or a semiconductor memory different from a magnetic tape.

The recording side or the reproducing side may be omitted from the signal recording and reproducing apparatus of the embodiment.

What is claimed is:

1. A video signal reproducing apparatus comprising:
means for reproducing a video signal from a recording medium, the video signal containing a time code signal and a corrective signal, the time code signal being incremented every field or frame of the video signal, the corrective signal being sequentially selected from among predetermined R different corrective signals in response to a remainder of dividing a number represented by the time code signal by a predetermined natural number Q equal to or greater than 2, wherein R denotes a predetermined natural number equal to or smaller than the number Q;

means for extracting the time code signal from the reproduced video signal;

means for dividing the number represented by the time code signal by the number Q, and generating a signal representing a remainder of said dividing;

means for identifying the corrective signal in the reproduced video signal in response to the remainder-representing signal; and means for correcting the reproduced video signal in response to a result of said identifying.

2. A video signal reproducing apparatus comprising:

means for reproducing a video signal from a recording medium, the video signal containing a time code signal and a corrective signal, the video signal further containing an information signal representing a presence and an absence of the corrective signal, the time code signal being incremented every field or frame of the video signal, the corrective signal being sequentially selected from among predetermined R different corrective signals in response to a remainder of dividing a number represented by the time code signal by a predetermined natural number Q equal to or greater than 2, wherein R denotes a predetermined natural number equal to or smaller than the number Q;

means for extracting the time code signal from the reproduced video signal;

means for extracting the information signal from the reproduced video signal;

means for dividing the number represented by the time code signal by the number Q, and generating a signal representing a remainder of said dividing;

means for identifying the corrective signal in the reproduced video signal in response to the remainder-representing signal and the extracted information signal; and means for correcting the reproduced video signal in response to a result of said identifying.

3. The apparatus of claim 2, further comprising means for reproducing an audio signal from the recording medium, means for extracting an audio identification signal from the reproduced video signal, the audio identification signal representing a type of the audio signal, means for outputting the reproduced audio signal in a changeable format, and means for setting said format in response to the audio identification signal.

* * * * *